US012772337B2

(12) United States Patent
Bergström et al.

(10) Patent No.: US 12,772,337 B2
(45) Date of Patent: Oct. 20, 2026

(54) REPORTING UE-INITIATED NETWORK RELEASE

(71) Applicant: Telefonaktiebolaget LM Ericsson (publ), Stockholm (SE)

(72) Inventors: Mattias Bergström, Sollentuna (SE); Pradeepa Ramachandra, Linköping (SE); Lian Araujo, Solna (SE); Marco Belleschi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 261 days.

(21) Appl. No.: 18/293,140

(22) PCT Filed: Jun. 28, 2022

(86) PCT No.: PCT/SE2022/050642
§ 371 (c)(1),
(2) Date: Jan. 29, 2024

(87) PCT Pub. No.: WO2023/014254
PCT Pub. Date: Feb. 9, 2023

(65) Prior Publication Data

US 2024/0381488 A1 Nov. 14, 2024

Related U.S. Application Data

(60) Provisional application No. 63/229,104, filed on Aug. 4, 2021.

(51) Int. Cl.
*H04W 60/00* (2009.01)
*H04W 76/10* (2018.01)
(Continued)

(52) U.S. Cl.
CPC ......... *H04W 76/38* (2018.02); *H04W 60/005* (2013.01); *H04W 76/10* (2018.02); *H04W 84/042* (2013.01)

(58) Field of Classification Search
CPC ... H04W 84/042; H04W 60/00; H04W 76/10; H04W 60/005; H04W 76/38; H04W 84/04
See application file for complete search history.

(56) References Cited

U.S. PATENT DOCUMENTS 8,577,360 B2 * 11/2013 Olsson .................. H04W 76/18 455/425

FOREIGN PATENT DOCUMENTS

WO 2021090179 A1 5/2021
WO 2021147958 A1 7/2021

OTHER PUBLICATIONS

"3GPP TS 37.320 V16.5.0", 3rd Generation Partnership Project; Technical Specification Group Radio Access Network; Universal Terrestrial Radio Access (UTRA), Evolved Universal Terrestrial Radio Access (E-UTRA) and Next Generation Radio Access; Stage 2 (Release 16), Jun. 2021, pp. 1-35.

(Continued)

*Primary Examiner* — Tuan H Nguyen
(74) *Attorney, Agent, or Firm* — Murphy, Bilak & Homiller, PLLC

(57) ABSTRACT

Embodiments include methods for a user equipment (UE) configured with user credentials for a plurality of public land mobile networks (PLMNs). Such methods include, while registered in first and second PLMNs and having a first connection with the first PLMN, releasing the first connection and logging information relating to the release of the first connection. Such methods include, after subsequently establishing a second connection with the first PLMN, sending to the first PLMN a first report including the logged information relating to the release of the first connection with the first PLMN. Other embodiments include complementary methods for a first network node of the first PLMN (Continued)

and a second network node of a second PLMN, as well as UEs and network nodes configured to perform such methods.

20 Claims, 10 Drawing Sheets

(51) Int. Cl.
*H04W 76/38* (2018.01)
*H04W 84/04* (2009.01)

(56) References Cited

OTHER PUBLICATIONS

"3GPP TS 38.306 V16.5.0", 3rd Generation Partnership Project; Technical Specification Group Radio Access Network; NR; User Equipment (UE) radio access capabilities (Release 16), Jun. 2021, pp. 1-47.

"3rd Generation Partnership Project; Technical Specification Group Services and System Aspects; System architecture for the 5G System (5GS); Stage 2 (Release 16)", 3GPP TS 23.501 V16.9.0, Jun. 2021, pp. 1-452.

"Multi-SIM Devices—Notification upon Network Switching", 3GPP TSG-RAN WG2 Meeting #113 electronic, R2-2101537, Online, Jan. 25-Feb. 5, 2021, pp. 1-3.

"MUSIM Network Switching", 3GPP TSG-RAN WG2 Meeting # 114 Electronic, R2-2105085, Online, May 19-27, 2021, pp. 1-5.

"3GPP TS 38.331 V16.5.0", 3rd Generation Partnership Project; Technical Specification Group Radio Access Network; NR; Radio Resource Control (RRC) protocol specification (Release 16), Jun. 2021, pp. 1-959.

"3GPP TR 36.805 V9.0.0", 3rd Generation Partnership Project; Technical Specification Group Radio Access Network; Study on Minimization of drive-tests in Next Generation Networks; (Release 9), Dec. 2009, pp. 1-24.

* cited by examiner

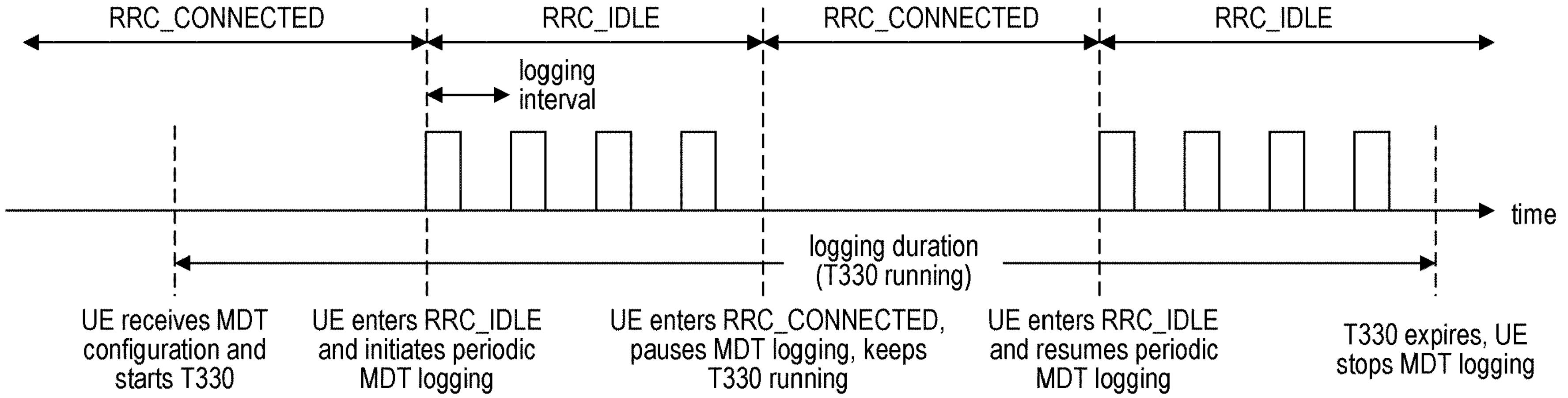

FIG. 5

```
-- ASN1START
-- TAG-UE-MeasurementsAvailable-START
UE-MeasurementsAvailable-r16 ::=    SEQUENCE {
    logMeasAvailable-r16                ENUMERATED {true}    OPTIONAL,
    logMeasAvailableBT-r16              ENUMERATED {true}    OPTIONAL,
    logMeasAvailableWLAN-r16            ENUMERATED {true}    OPTIONAL,
    connEstFailInfoAvailable-r16        ENUMERATED {true}    OPTIONAL,
    rlf-InfoAvailable-r16               ENUMERATED {true}    OPTIONAL,
    ...
}
-- TAG-UE-MeasurementsAvailable-STOP
-- ASN1STOP
```

FIG. 6

REPORTING UE-INITIATED NETWORK RELEASE

TECHNICAL FIELD

The present disclosure generally relates to wireless networks and particularly relates to improved techniques for managing user equipment (UEs) that are configured with multiple user subscriptions to different public land mobile networks (PLMNs).

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that can communicate with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

Currently the fifth generation ("5G") of cellular systems, also referred to as New Radio (NR), is being standardized within the Third-Generation Partnership Project (3GPP). NR is developed for maximum flexibility to support multiple and substantially different use cases but shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. In addition to RRC_IDLE and RRC_CONNECTED, the NR RRC layer also includes an RRC_INACTIVE state with properties similar to a "suspended" condition in LTE Rel-13.

A UE can be configured to perform and report measurements to support minimization of drive tests (MDT), which is intended to reduce and/or minimize the requirements for manual testing of actual network performance (i.e., by driving around the geographic coverage of the network). MDT was first studied in LTE Rel-9 (e.g., 3GPP TR 36.805) and first standardized in LTE Rel-10 and is also supported in ongoing NR releases. MDT can support network performance improvements such as coverage optimization, capacity optimization, mobility optimization, quality-of-service (QoS) verification, and parameterization for common channels (e.g., PDSCH).

In general, MDT measurements can be configured to be reported upon being performed ("immediate MDT") or logged and reported at some later event ("logged MDT"). 3GPP is currently studying how to support UEs that can manage two or more concurrent subscriptions to different public land mobile networks (PLMNs), e.g., with multiple subscriber identity modules (i.e., Multi-SIM or MUSIM). A single UE having two or more subscriber credentials can "act" as different UE's according to which subscription is active at any given time. Even though certain UEs may have some of these capabilities, most operations are not optimized and there is currently no 3GPP-standardized support for multi-SIM.

SUMMARY

One exemplary scenario is a UE in RRC_CONNECTED state in a second PLMN (i.e., to which the user subscribes) has to perform operations in a first PLMN, such as listen to paging, acquire broadcast SI, cell reselection, etc. There are two possible procedures that the UE can follow in this scenario. The first is known as "RRC switching procedure without leaving RRC_CONNECTED," such as when the UE listens to paging in first PLMN during short periods and then shortly switches back to second PLMN, while remaining in RRC_CONNECTED state in the second PLMN during the operation in the first PLMN.

The second is known as "RRC switching procedure for leaving RRC_CONNECTED," such as when the UE initiates a service in first PLMN (e.g., responding to paging) and thus cannot shortly switch back to second PLMN, causing the UE to leave RRC_CONNECTED state in the second PLMN. However, there can be various problems, issues, and/or difficulties when the UE leaves RRC_CONNECTED state in the second PLMN in this manner.

Embodiments of the present disclosure provide specific improvements to operation of MUSIM-capable UEs in wireless networks, such as by facilitating solutions to overcome exemplary problems summarized above and described in more detail below.

Embodiments of the present disclosure include methods (e.g., procedures) for a user equipment (UE, e.g., wireless device) configured with user credentials for a plurality of public land mobile networks (PLMNs).

These exemplary methods can include, while registered in first and second PLMNs and having a first connection with the first PLMN, releasing the first connection and logging information relating to the release of the first connection. These exemplary methods can also include, after subsequently establishing a second connection with the first PLMN, sending the first PLMN a first report including the logged information relating to the release of the first connection with the first PLMN.

In some embodiments, these exemplary methods can also include transmitting to the first PLMN a request to release the first connection with the first PLMN and initiating a first timer upon transmitting the request to release the first connection with the first PLMN. Releasing the first connection and logging the information can be performed upon expiration of the first timer without receiving a response from the first PLMN to the UE's request to release the first connection with the first PLMN.

In some of these embodiments, these exemplary methods can also include initiating a second timer upon expiration of the first timer and stopping the second timer upon establishing the second connection with the first PLMN. The value of the second timer upon stopping is included in the logged information.

In some of these embodiments, one or more of the following applies:

- the UE is not configured to request release of the first connection by the first PLMN;
- the logged information includes an indication of whether the UE is configured to request release of the first connection by the first PLMN; and
- the logged information includes a cause of the release request.

In other embodiments, the UE is configured to request release of the first connection by the first PLMN and these exemplary methods can also include refraining from requesting release of the first connection by the first PLMN before releasing the first connection. In such embodiments, the logged information includes an indication that the UE did not request release of the first connection before the UE released the first connection.

In some embodiments, these exemplary methods can also include receiving a request for the logged information from the first PLMN after establishing the second connection with the first PLMN. The first report is sent in response to the request for the logged information. In some of these embodiments, these exemplary methods can also include sending the first PLMN a presence indication for logged information relating to the release of the first connection with the first PLMN, e.g., after establishing the second connection with the first PLMN. The request can be received in response to the presence indication.

In some embodiments, these exemplary methods can also include, after releasing the first connection with the first PLMN, establishing a first connection with the second PLMN and sending the second PLMN a second report including at least a portion of the logged information relating to the release of the first connection with the first PLMN.

In some of these embodiments, these exemplary methods can also include, after establishing the first connection with the second PLMN, receiving from the second PLMN a request for the logged information. The second report can be sent in response to the request for the logged information. In some of these embodiments, these exemplary methods can also include, after establishing the first connection with the second PLMN, sending to the second PLMN a presence indication for logged information relating to the UE's release of the first connection with the first PLMN. The request can be received from the second PLMN in response to the presence indication.

In some of these embodiments, one or more of the following applies:

the second report (i.e., sent to the second PLMN) includes an indicator that the logged information is not associated with the second PLMN; and the first report (i.e., sent to the first PLMN) does not include an indicator that the logged information is associated with the first PLMN.

In some variants, the indicator that the logged information is not associated with the second PLMN is an identifier of the first PLMN.

In some of these embodiments, the logged information includes cell identifiers of the first PLMN, and the second report excludes the cell identifiers. In some of these embodiments, these exemplary methods can also include retaining the logged information in UE memory after sending the second report.

In various embodiments, the logged information includes one or more of the following:

serving cell measurements of one or more of the following in the first PLMN: the UE's PCell, the UE's PSCell, the UE's MCG SCells, and the UE's SCG SCells;

measurements of neighbor cells operating at one or more of the following: a frequency of the UE's PCell, a frequency of the UE's PSCell, one or more frequencies of the UE's MCG SCells, and one or more frequencies of the UE's SCG SCells;

UE location information;

cell identifiers of the first PLMN; and information from one of more UE sensors.

Other embodiments include methods (e.g., procedures) for a first network node (e.g., base station, eNB, gNB, ng-eNB, en-gNB, etc., or components thereof) configured to operate in a first PLMN and to manage a UE configured with user credentials for a plurality of PLMNs.

These exemplary methods can include, while the UE is registered in the first PLMN and in a second PLMN and has a first connection with the first PLMN, receiving from the UE a request to release the UE's first connection with the first PLMN. These exemplary methods can also include, after subsequently establishing with the UE a second connection with the first PLMN, receiving from the UE a first report including logged information relating to the UE's release of the first connection with the first PLMN.

In some embodiments, these exemplary methods can also include refraining from sending a response to the release request, for at least a preconfigured duration. In some of these embodiments, the logged information includes an indication of a duration between the following: when the UE released the first connection with the first PLMN, and establishing the UE's second connection with the first PLMN.

In some of these embodiments, one or more of the following applies:

the UE is not configured to request release of the first connection from the first PLMN;

the logged information includes an indication of whether the UE is configured to request release of the first connection from the first PLMN; and the logged information includes a cause of the release request.

In other embodiments, the UE is configured to request release of the first connection by the first PLMN and the logged information includes an indication that the UE did not request release of the first connection before the UE released the first connection.

In some embodiments, these exemplary methods can also include, after establishing with the UE the second connection with the first PLMN, sending the UE a request for the logged information. The first report can be received in response to the request for the logged information. In some of these embodiments, these exemplary methods can also include, after establishing with the UE the second connection with the first PLMN, the first network node can receive from the UE a presence indication for logged information relating to the release of the first connection. The request can be sent in response to the presence indication.

In various embodiments, the logged information can include any of the logged information mentioned above in relation to UE embodiments.

Other embodiments include methods (e.g., procedures) for a second network node (e.g., base station, eNB, gNB, ng-eNB, en-gNB, etc., or components thereof) configured to operate in a second PLMN and to manage a UE configured with user credentials for a plurality of PLMNs.

These exemplary methods can include establishing with the UE a first connection with the second PLMN. These exemplary methods can also include subsequently receiving from the UE a second report including at least a portion of logged information relating to the UE's release of a first connection with a first PLMN.

In some embodiments, the first connection with the second PLMN is established after the UE releases the first connection with the first PLMN.

In some embodiments, these exemplary methods can also include sending the UE a request for the logged information after establishing with the UE the first connection with the second PLMN. The second report can be received in response to the request for the logged information. In some of these embodiments, these exemplary methods can also include, after establishing with the UE the first connection with the second PLMN, receiving from the UE a presence indication for logged information relating to the UE's release of the first connection with the first PLMN. The request can be sent in response to the presence indication.

In some of these embodiments, the second report includes an indicator that the logged information is not associated with the second PLMN. In some of these embodiments, the indicator that the logged information is not associated with the second PLMN is an identifier of the first PLMN.

In various embodiments, the logged information (i.e., from the UE) can include any of the logged information summarized above in relation to UE embodiments. At least a portion of this logged information can be received in the second report. In some variants, when the logged information includes cell identifiers of the first PLMN, the second report excludes the cell identifiers.

Other embodiments include UEs (e.g., wireless devices, IoT devices, etc. or component(s) thereof) and network nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or RNNs to perform operations corresponding to any of the exemplary methods described herein.

These and other embodiments described herein can provide indication to the first PLMN that a connection between the UE and the first PLMN was released due to a UE autonomous release from the first PLMN (e.g., to switch to the second PLMN). In this manner, the first PLMN operator can be informed about whether a lost connection with the UE is due to a problem with the link between the UE and the network, or due to a UE-autonomous release of the connection. The first PLMN operator can consider this cause information when deciding if/when to take actions to tune that network. This avoids degradations to network performance caused by network adjustments and/or tuning based on misunderstandings or lack of information.

These and other objects, features, and advantages of embodiments of the present disclosure will become apparent upon reading the following Detailed Description in view of the Drawings briefly described below.

BRIEF DESCRIPTION OF THE DRAWINGS

FIG. 5 shows an exemplary periodic logged MDT procedure performed by a UE.

FIG. 6 shows an ASN.1 data structure for an exemplary UE-MeasurementsAvailable information element (IE).

DETAILED DESCRIPTION

Figure 1:
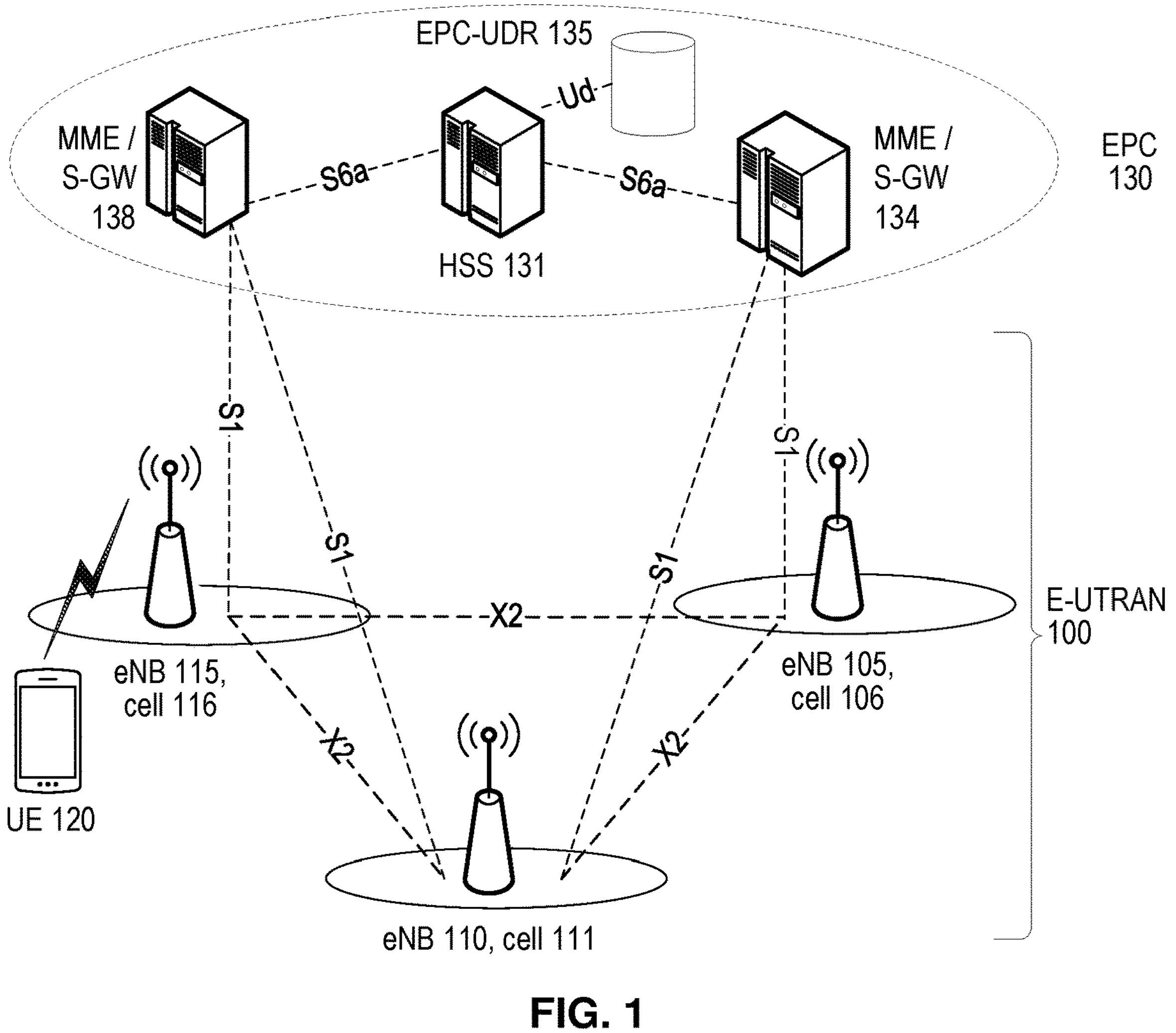
FIG. 1 shows a high-level view of an exemplary LTE network architecture.
Figure 2:
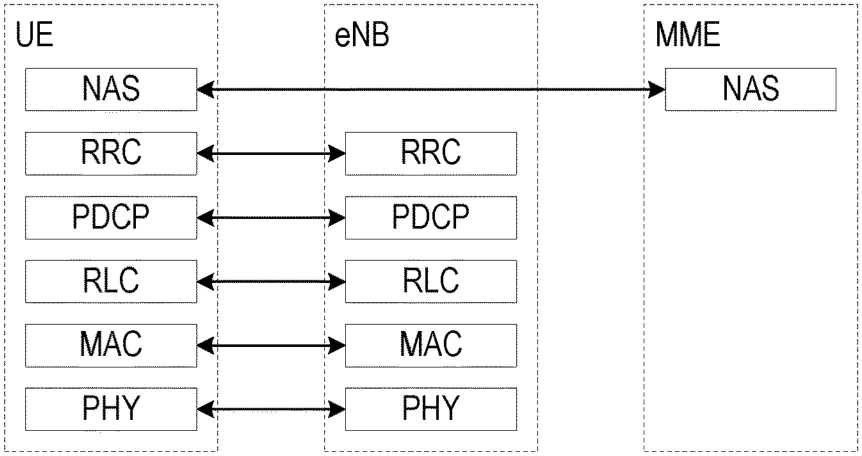
FIG. 2 shows an exemplary configuration of an LTE control plane (CP) protocol stack.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

3GPP Rel-10 supports bandwidths larger than 20 MHz. One important Rel-10 requirement is backward compatibility with Rel-8. As such, a wideband LTE Rel-10 carrier (e.g., >20 MHz) should appear as a plurality of carriers ("component carriers" or CCs) to a Rel-8 ("legacy") terminal. Legacy terminals can be scheduled in all parts of the wideband Rel-10 carrier. One way to achieve this is by Carrier Aggregation (CA), whereby a Rel-10 terminal can receive multiple CCs, each preferably having the same structure as a Rel-8 carrier.

LTE dual connectivity (DC) was introduced in Rel-12. In DC, a UE in RRC_CONNECTED state consumes radio resources provided by at least two different network points connected to one another with a non-ideal backhaul. In LTE, these two network points may be referred to as a "Master eNB" (MeNB) and a "Secondary eNB" (SeNB). More generally, these can be called master node (MN) and secondary node (SN). DC can be viewed as a special case of CA, in which the aggregated carriers (or cells) are provided by network nodes that are physically separated and not connected via a robust, high-capacity connection.

In DC, the UE is configured with a Master Cell Group (MCG) associated with the MN and a Secondary Cell Group (SCG) associated with the SN. Each of the CGs is a group of serving cells that includes one MAC entity, a set of logical channels with associated RLC entities, a primary cell (PCell), and optionally one or more secondary cells (SCells). The term "Special Cell" (or "SpCell" for short) refers to the PCell of the MCG or the PSCell of the SCG depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

Several DC (or more generally, multi-connectivity) scenarios are also available in 5G/NR. These include NR-DC that is similar to LTE-DC discussed above, except that both the MN and SN (referred to as "gNBs") employ the NR interface to communicate with the UE. In addition, various multi-RAT DC (MR-DC) configurations are available, in which one of the MN and SN use NR and the other of the MN and SN uses LTE.

Figure 3:
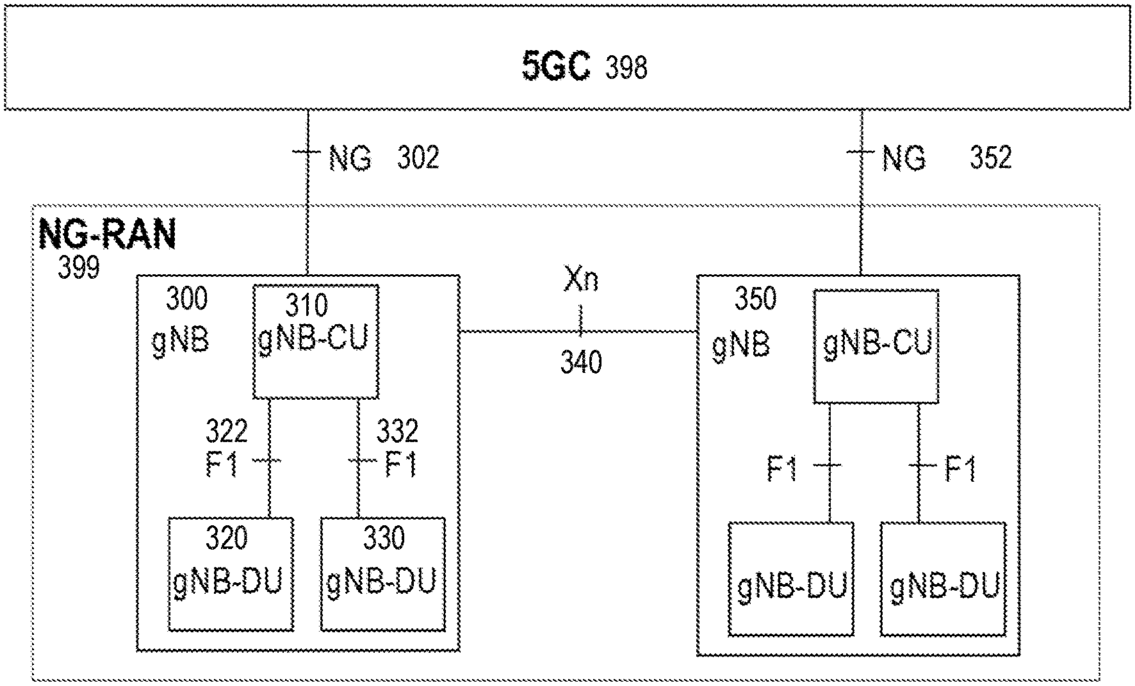
FIGS. 3-4 show high-level views of exemplary 5G/NR network architectures.

FIG. 3 illustrates a high-level view of an exemplary 5G network architecture, consisting of a Next Generation RAN (NG-RAN 399) and a 5G Core (5GC 398). NG-RAN 399 can include a set of gNodeB's (gNBs) connected to the 5GC via one or more NG interfaces, whereas the gNBs can be connected to each other via one or more Xn interfaces, such as Xn interface 340 between gNBs 300 and 350 in FIG. 3. Each of the gNBs can support frequency division duplexing (FDD), time division duplexing (TDD), or a combination thereof on the NR interface to UEs.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport.

The NG RAN logical nodes shown in FIG. 3 include a central (or centralized) unit (CU or gNB-CU) and one or more distributed (or decentralized) units (DU or gNB-DU). For example, gNB 300 in FIG. 3 includes gNB-CU 310 and gNB-DUs 320 and 330. CUs are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry.

A gNB-CU connects to its associated gNB-DUs over respective F1 logical interfaces, such as interfaces 322 and 332 shown in FIG. 3. The gNB-CU and connected gNB-DUs are only visible to other gNBs and the 5GC as a gNB, e.g., the F1 interface is not visible beyond gNB-CU. In the gNB split CU-DU architecture illustrated by FIG. 3, DC can be achieved by allowing a UE to connect to multiple DUs served by the same CU or by allowing a UE to connect to multiple DUs served by different CUs.

Figure 4:
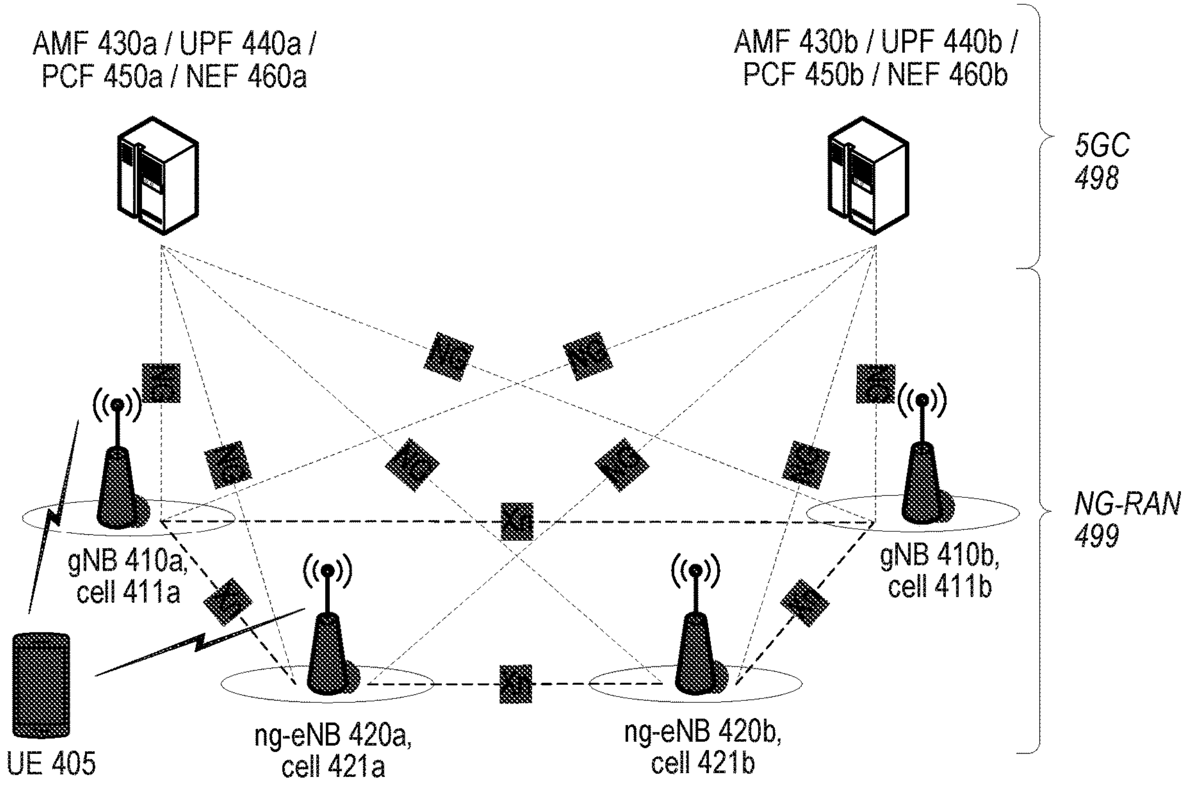

FIG. 4 shows another high-level view of an exemplary 5G network architecture, including NG-RAN 499 and 5GC 498. As shown in the figure, NG-RAN 499 can include gNBs (e.g., 410*a,b*) and ng-eNBs (e.g., 420*a,b*) that are interconnected with each other via respective Xn interfaces. The gNBs and ng-eNBs are also connected via the NG interfaces to 5GC 498, more specifically to Access and Mobility Management Functions (AMFs, e.g., 430*a,b*) via respective NG-C interfaces and to User Plane Functions (UPFs, e.g., 440*a,b*) via respective NG-U interfaces. Moreover, the AMFs 430*a,b* can communicate with one or more policy control functions (PCFs, e.g., 450*a,b*) and network exposure functions (NEFs, e.g., 460*a,b*).

Each of the gNBs can support the NR radio interface including FDD, TDD, or a combination thereof. In contrast, each of ng-eNBs can support the LTE radio interface but, unlike conventional LTE eNBs (e.g., in FIG. 1), connect to the 5GC via the NG interface. Each or gNB or ng-eNB can serve a geographic coverage area including one more cells, such as cells 411*a-b* and 421*a-b* shown in FIG. 4. Depending on the cell in which it is located, a UE 405 can communicate with the gNB or ng-eNB serving that cell via the NR or LTE radio interface, respectively.

In some embodiments, the gNBs and ng-eNBs can also use various directional beams to provide coverage in the respective cells. In general, a DL "beam" is a coverage area of a network-transmitted reference signal (RS) that may be measured or monitored by a UE. In NR, for example, such RS can include any of the following, alone or in combination: synchronization signal/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

A UE in RRC_CONNECTED state can be configured by the network to perform logged MDT measurements in RRC_IDLE or RRC_INACTIVE (for NR) state and/or immediate MDT measurements while in RRC_CONNECTED state. For logged MDT, the UE receives a configuration in a LoggedMeasurementConfiguration message. This message includes traceReference, tce-Id, and traceRecordingSessionRefparameters that identify the trace collection entity (TCE) that originated the request and should receive the MDT report.

For event-triggered logged MDT, the configuration includes an eventType and logginginterval. The UE logs the measurement reports at every logginginterval while in RRC_IDLE or RRC_INACTIVE state, so long as the event indicated in eventType is satisfied.

FIG. 5 shows an exemplary periodic logged MDT procedure performed by a UE. The received configuration includes a logginginterval and a loggingduration. The ULE starts a timer (T330) set to loggingduration (e.g., 10-120 min) upon receiving the configuration, and performs periodic MDT logging every logginginterval (1.28-61.44 s) within the loggingduration while the UE is in RRC_IDLE state (or in RRC_INACTIVE, not shown). When the UE transitions to RRC_CONNECTED during the loggingduration, the UE pauses or stops the ongoing MDT measurement logging while leaving T330 running, and then resumes the MDT measurement logging with the same logginginterval upon returning to RRC_IDLE. The UE stops the logging upon expiration of T330 and The UE collects DL RS received strength and quality (i.e., RSRP, RSRQ) based on existing measurements required for cell reselection purposes. In other words, the UE is not required to perform additional LTE or NR measurements beyond those existing ones. The UE also logs detailed location information, WLAN measurements, and Bluetooth measurements, to the extent that these are available. The UE reports the logged information to the network when the UE returns to RRC_CONNECTED state.

As described in 3GPP TS 37.320 (v16.5.0), a UE only stores one logged measurement configuration for each RAT. When the network provides a new configuration for a RAT, any previously configured logged measurement configuration for that RAT will be entirely replaced by the new one. Moreover, logged measurements corresponding to the previous configuration will be cleared at the same time. Thus, the network should retrieve any relevant data before providing a new configuration. In case a PLMN that does not belong to the MDT PLMN list provides a logged measurement configuration, any existing logged measurement configuration and corresponding measurement log are cleared and overwritten without being retrieved.

Additionally, the UE only collects logged MDT measurements while in RRC_IDLE or RRC_INACTIVE state until the UE's memory allocated for that purpose expires and/or is filled. The allocated memory is minimum 64 KB, as specified in 3GPP TS 38.306 (v16.5.0).

Upon returning to RRC_CONNECTED state, the UE informs the network about the availability of a logged measurement report. In NR, this is done by the UE including a UE-MeasurementsAvailable IE in one of the following messages: RRCSetupComplete, RRCReconfigurationComplete, RRCResumeComplete, and RRCReestablishmentComplete. FIG. 6 shows an ASN.1 data structure for an exemplary UE-MeasurementsAvailable IE. Inclusion of the logMeasAvailable field indicates logged MDT measurements are available, while exclusion of this field indicates that no logged MDT measurements are available. As described in 3GPP TS 37.320, a UE will not indicate the availability of MDT measurements in another RAT or in a PLMN that is not in the MDT PLMN list.

Upon receiving an indication of logMeasReport availability, the network can retrieve the information via a UEInformationRequest message to the UE. This message includes a logMeasReportReq field when the network wants to receive the logMeasReport. UE then responds to it by sending UEInformationResponse message including the logMeasReport. If the logMeasReport can't be transferred in one message, the UE also includes the indication of this condition in the UEInformationResponse message.

When logged MDT measurements are retrieved by the network before the completion of the pre-defined logging duration, the reported measurement results are deleted, but MDT measurement logging will continue according to ongoing logged measurement configuration. If the network does not retrieve logged MDT measurements in response to the indication, the ULE should store the logged measurements for 48 hours after the end of the corresponding loggingduration (i.e., T330 expiration). There is no requirement for the ULE to store logged measurements for any longer than this period. In addition, any existing logged measurement configuration and corresponding measurement log are cleared and overwritten when the UE switches off or detaches from the network.

Additionally, a UE can be configured to perform and report immediate MDT measurements while in RRC_CONNECTED state. Like logged MDT measurements, immediate MDT measurements are based on existing UE and/or network measurements performed while a UE is in RRC_CONNECTED, and can include any of the following measurement quantities:

M1: RSRP and RSRQ measurement by UE.

M2: Power Headroom measurement by UE.

M3: Received Interference Power measurement by eNB.

M4: Data Volume measurement separately for DL and UL, per QoS class indicator (QCI) per UE, by eNB.

M5: Scheduled IP layer Throughput for MDT measurement separately for DL and UL, per RAB per UE and per UE for the DL, per UE for the UL, by eNB.

M6: Packet Delay measurement, separately for DL and UL, per QCI per UE, see UL PDCP Delay, by the UE, and Packet Delay in the DL per QCI, by the eNB.

M7: Packet Loss rate measurement, separately for DL and UL per QCI per UE, by the eNB.

M8: received signal strength (RSSI) measurement by UE.

M9: round trip time (RTT) measurement by UE.

For example, the reporting of M1 measurements can be event-triggered according to existing RRM configuration for any of events A1-A6 or B1-B2. In addition, M1 reporting can be periodic, A2 event-triggered, or A2 event-triggered periodic according to an MDT-specific measurement configuration. As another example, the reporting of M2 measurements can be based on reception of Power Headroom Report (PHR), while reporting for M3-M9 can be triggered by the expiration of a measurement collection period.

As briefly mentioned above, 3GPP is currently studying how to best support UEs that can manage two or more concurrent subscriptions to different public land mobile networks (PLMNs), e.g., with multiple subscriber identity modules (i.e., Multi-SIM or MUSIM). A single UE having two or more subscriber credentials can behave as different UEs according to which subscription is active at any given time. Even though certain UEs may have some of these capabilities, most operations are not optimized and there is currently no 3GPP-standardized support for multi-SIM.

One possible improvement is an easier switch between states related to use of a first subscription to a first PLMN (with user credentials in a first USIM) and states related to use of a second subscription to a second PLMN (with user credentials in a second USIM). This can be particularly important when such states are dependent, e.g., CM-Connected in first and second PLMNs. Such switching may be straightforward, or even unnecessary, if the UE has the capability of communicating simultaneously with the first and second PLMNs using the first and second USIMs. This may require at least dual receiver and transmitter chains, frequencies that are used towards both networks don't interfere with each other, and radio separation is good enough to avoid interference (e.g., intermodulation, IM, effects) within the UE itself.

For UEs that cannot simultaneously communicate with two PLMNs in this manner, another possible approach is to introduce signaling that allows a UE to at least signal a network that it is leaving, or becoming unreachable for, a particular PLMN. One exemplary scenario is a UE in RRC_CONNECTED state in a second PLMN (i.e., to which the user subscribes) has to perform operations in a first PLMN, such as listen to paging, broadcast SI acquisition, cell reselection, etc.

There are two possible procedures that the UE can follow in this scenario. The first is known as "RRC switching procedure without leaving RRC_CONNECTED," such as when the UE listens to paging in a second PLMN during short periods and then shortly switches back to a first PLMN, while remaining in RRC_CONNECTED state in the first PLMN during the operation in the second PLMN. The second is known as "RRC switching procedure for leaving RRC_CONNECTED," such as when the UE initiates a service in a second PLMN (e.g., responding to paging) and thus cannot shortly switch back to a first PLMN, causing the UE to leave RRC_CONNECTED state in the first PLMN.

3GPP RAN2 working group has reached the following agreements on various switching-related issues:

- Switching procedure can be used to notify the first PLMN ("network A") that the UE has a preference to leave RRC_CONNECTED state in network A.
- Switching procedure can be used to notify network A that the UE has a preference to be kept in RRC_CONNECTED state in network A while temporarily switching to the second PLMN ("network B").
- RRC signaling is used for switching procedure without leaving RRC_CONNECTED state in network A for UE temporarily switching to network B as a baseline. Need for additional MAC signaling is for further study (FFS).

- During switching procedure for leaving RRC_CONNECTED state, the UE is allowed to enter RRC_IDLE state if it does not receive response message from the network within a certain configured time period. This issue is FFS for RRC_INACTIVE state.
- Access stratum (AS)-based solution for network switching includes two steps:
  - If configured, UE can send an RRC message to leave RRC_CONNECTED for MUSIM purpose, and
  - gNB may release the UE to RRC_IDLE/RRC_INACTIVE.

For the RRC switching procedure for leaving RRC_CONNECTED, the UE may be configured with a "leaving time period", such that when the leaving time period is over, the UE may enter RRC_IDLE state even without having received an RRCRelease message from the first PLMN (or network B). Additionally, the UE may autonomously leave the first PLMN at the leaving time period after the UE has sent a request to leave that network (also called a "release request" or a "release preference"), even if the first PLMN has not released the UE by the end of that period.

Even so, the UE autonomously leaving the first PLMN in this manner can cause various problems, issues, and/or difficulties. For example, the network may experience the UE-triggered autonomous release as a connection (or link) failure with the UE—which is not the actual cause of the release. Put differently, the network is unable to distinguish a UE-triggered release from an actual link failure, which can cause the network (or a network operator) to take actions based on this erroneous release cause information, such as tuning the network to avoid such "link failures". Such actions may result in network performance degradations.

Accordingly, embodiments of the present disclosure provide techniques whereby a MUSIM UE, being simultaneously registered in first and second PLMNs, having corresponding first and second USIMs, logs and reports to the first PLMN that a connection between the UE and the first PLMN was released due to a UE autonomous release from the first PLMN (e.g., to switch to the second PLMN). In this manner, the first PLMN operator can be informed about whether a lost connection with the UE is due to a problem with the link between the UE and the network, or due to a UE-autonomous release of the connection (e.g., to switch to the second PLMN). The first PLMN operator can consider this cause information when deciding if/when to take actions to tune that network.

Embodiments of the present disclosure will now be described in more detail. In this description, the phrase "release a connection" is used in a general sense and not necessarily to refer to an RRC release procedure as specified by 3GPP. The term "MUSIM UE" refers to the UE that is registered in the first and second PLMNs (e.g., based on corresponding first and second USIMs with credentials) and performs the described operations.

In some embodiments, a UE can log a UE-initiated release from a first PLMN when the UE wants or needs to connect to a second PLMN. For example, if the UE has multiple SIMs and is initially connected to a first PLMN associated with a first SIM, but the UE needs to connect to a second PLMN associated with a second SIM, the UE may then indicate to the first PLMN that it prefers to be released from the first PLMN. This indication may be referred to as a "release request" or a "release preference". The first PLMN may release the UE in response to receiving a release request from the UE. If the first PLMN does not release the UE in response to the release request, the UE may be configured to release its connection to the first PLMN anyway (i.e., autonomously). According to these embodiments, the UE logs this UE-initiated release event can later report the logged event to the first PLMN.

In some embodiments, the reporting from the UE to the first PLMN about UE-initiated release events described above may be requested by the first PLMN. If the UE has such an event logged, the UE reports back this logged information. In some embodiments, the UE can indicate to the first PLMN whether the UE has (one or more) logged release events to report. This indication may be referred to as a "presence indication" since it indicates presence of logged UE-initiated release event(s). The first PLMN may respond to a presence indication by requesting the UE to report the indicated UE-initiated release event(s). If the UE does not indicate presence of release events, the first PLMN may refrain from requesting the UE to report such events.

In some embodiments, the UE may be configured to autonomously release from the first PLMN no earlier than a time (T) after sending a release request. In such embodiments, the UE can log and report the time (T) associated with the UE-initiated release. In some embodiments, at the end of this time T (e.g., upon expiration of a so-called "leaving timer"), the UE can log one or more of the following measurements, which also can be reported to the first PLMN.

- Serving cell measurements (e.g., RSRP, RSRQ, SINR, etc.) of the UE's PCell in the first PLMN
- Measurements (e.g., RSRP, RSRQ, SINR, etc.) of neighbor cells at the PCell frequency in the first PLMN;
- Serving cell measurements of the UE's PSCell in the first PLMN;
- Measurements of neighbor cells at the PSCell frequency in the first PLMN;
- Serving cell measurements of the UE's MCG SCells in the first PLMN;
- Measurements of neighbor cells at the MCG SCell frequencies in the first PLMN;
- Serving cell measurements of the UE's SCG SCells in the first PLMN;
- Measurements of neighbor cells at the SCG SCell frequencies in the first PLMN;
- Location information; and
- Sensor information.

In some embodiments, at the end (or expiration) of this time T, the UE can initiate a second timer and stop this second timer upon returning to the first PLMN. The final value of this second timer can indicate the time the UE spends away from the first PLMN. The final value of the second timer can be logged and reported to the first PLMN, e.g., after the UE's return to the first PLMN. More generally, the UE can log and report how much time has passed since the UE-initiated release from the first PLMN.

In some situations, however, the UE may need to release its connection immediately such that the UE does have time to send a release request to the network, even if the UE was previously configured to send such requests when the UE needs to be released. In some embodiments, the UE can log (and possibly report to the first PLMN) that the UE released the connection with the first PLMN without sending a release request, as previously configured.

Alternately, when the first PLMN does not configure the UE to send release requests, the UE has no way to send such requests—even if the UE needs to release the connection to the first PLMN, e.g., to connect to the second PLMN. Consider for example a legacy first PLMN that has not implemented the release request functionality and, thus, would not configure UEs to send release requests. Nevertheless, UEs served by a legacy PLMN may need to release from the legacy PLMN, e.g., for multi-SIM operations. In some embodiments, the UE can log (and possibly report to the first PLMN) a UE-initiated release from the first PLMN even when the UE is not configured to send a release request to the first PLMN.

To be able to distinguish between UE-initiated release performed when the UE was configured or not configured with release request functionality, the UE may log (and possibly report to the first PLMN) whether the UE was configured with release request functionality in relation to a UE-initiated release event.

In some embodiments, the UE can log (and possibly report to the first PLMN) information about a release by the first PLMN that was preceded by a "release request" from the UE. For example, the UE can log a duration between sending the release request to the first PLMN and being released by the first PLMN. In some embodiments, the UE can log (and possibly report to the first PLMN) a cause of the release request.

In some embodiments, the UE can be configured for cross-network reporting of logged release information. For example, the UE can report to the second PLMN logged information about release from the first PLMN, or vice versa.

In current MDT reporting, the UE will report logged information only once, after which the UE discards (or otherwise does not maintain) the reported information. When cross-network reporting is configured, according to these embodiments, the UE can report logged information about a particular release event to multiple PLMNs (e.g., first and second PLMNs). As such, the UE does not discard the reported information after the first reporting.

In some of these embodiments, the UE can include in the report an identifier of (or otherwise indicate) the network (e.g., first PLMN) to which the report applies. For example, the identifier may be a PLMN identity. In other of these embodiments, the UE can include the identifier only when sending the report to a network other than the one to which the report applies. For example, if a logged release event relates to the first PLMN, the UE would include an identifier of first PLMN when reporting the logged information to the second PLMN but not when reporting the logged information to the first PLMN. When the first PLMN receives the report without a network identifier, it infers that the report applies to itself (i.e., the first PLMN).

In a variant, rather than including a network identifier, the UE can include an indicator that the report applies to a network other than the one receiving the report. In this manner, the UE can avoid providing to other (e.g., competitor) networks details of behavior that can be associated with a particular network.

In some embodiments, the UE can report the same logged event information to multiple PLMNs, including any of the logged information discussed above. In other embodiments, the UE can report only a subset of logged event information to a PLMN other than the PLMN in which the event occurred, while reporting a larger amount (e.g., all) of the logged event information to the network in which the event occurred. For example, the UE may filter out cell IDs when sending to a network other than the network in which the event occurred.

Figure 7:
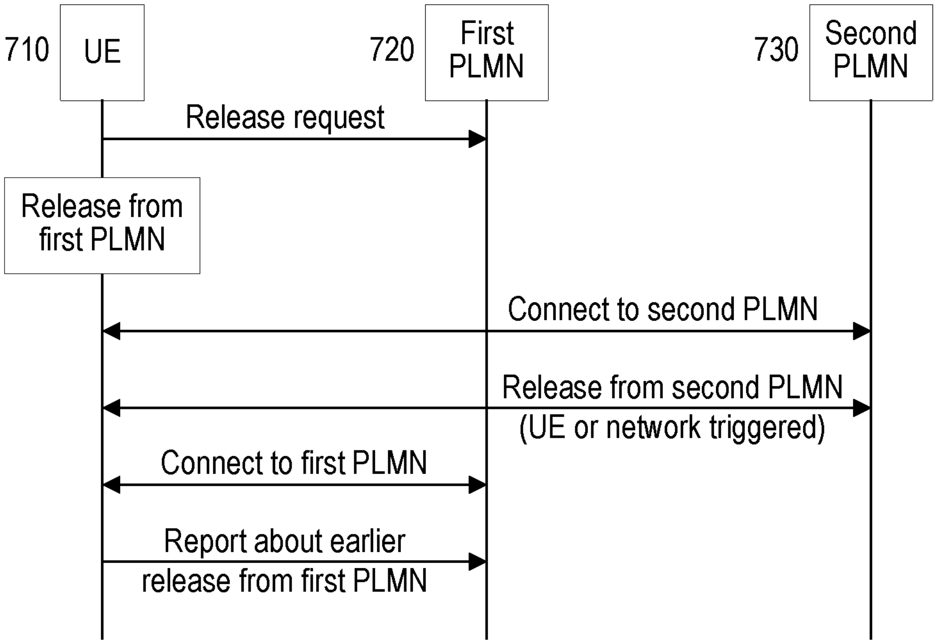
FIG. 7 is a signal flow diagram for an exemplary procedure between a UE, a first PLMN, and a second PLMN, according to various embodiments of the present disclosure.

FIG. 7 is a signal flow diagram for an exemplary procedure according to some embodiments of the present disclosure. In particular, FIG. 7 shows signaling between a UE (710), a first PLMN (720), and a second PLMN (730). For example, the UE can be a MUSIM UE.

Initially, the UE sends a release request to the first PLMN. The release request can be triggered by the UE wanting or needed to connect to the second PLMN, e.g., for multi-SIM operations. Subsequently, after some duration (e.g., T mentioned above) without being released by the first PLMN, the UE autonomously initiates a release from the first PLMN. The UE logs information related to the UE-initiated release, including any of the information discussed above for various embodiments.

The UE subsequently connects to the second PLMN. After some time, the UE releases from the second PLMN or is released by the second PLMN. Subsequently, the UE connects against to the first PLMN and sends the first PLMN a report including the logged information about the earlier UE-initiated release from the first PLMN. Although not shown, the report may be responsive to a request from the first PLMN, and/or may be preceded by the UE sending the first PLMN a presence indication that such logged information is available at the UE. The present disclosure refers to various operations being performed by, towards, or with the first PLMN or the second PLMN. This can include performing such operations by, towards, or with a network node of the first PLMN or the second PLMN, such as a network node serving a cell to which a UE is connected.

Figure 8:
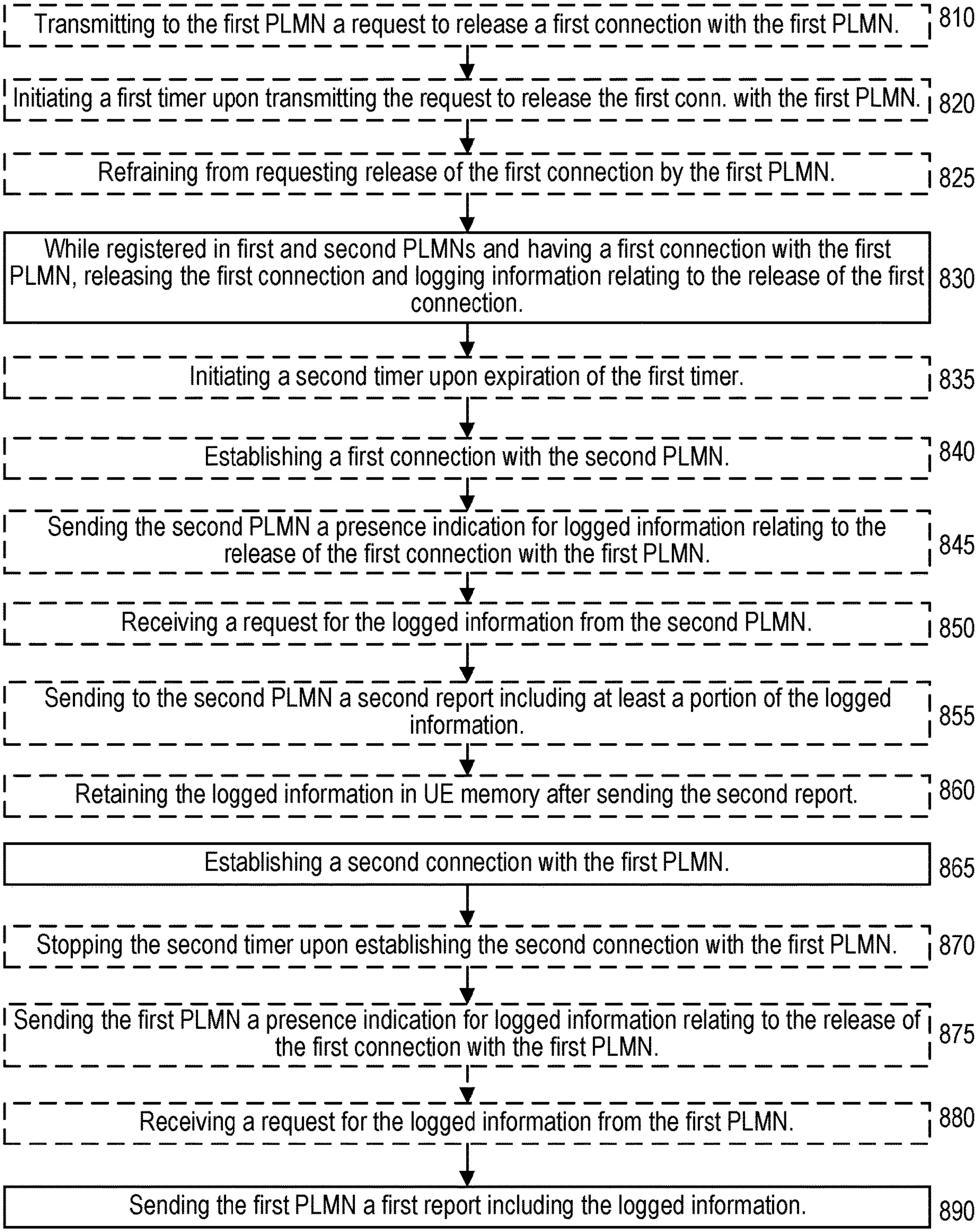
FIG. 8 is a flow diagram of an exemplary method (e.g., procedure) for a UE (e.g., wireless device, IoT device, etc. or component(s) thereof), according to various embodiments of the present disclosure.
Figure 9:
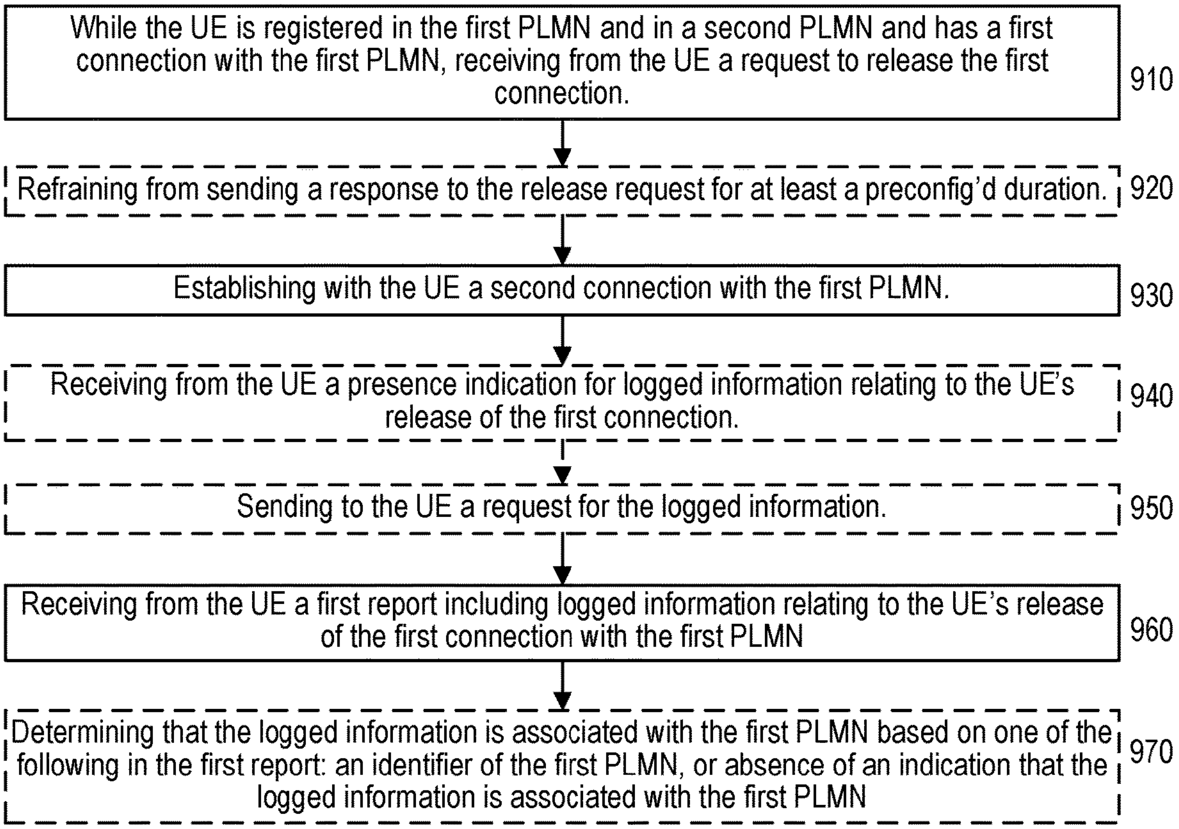
FIG. 9 is a flow diagram of an exemplary method (e.g., procedure) for a first network node (e.g., base station, eNB, gNB, ng-eNB, en-gNB, etc. or component(s) thereof), according to various embodiments of the present disclosure.
Figure 10:
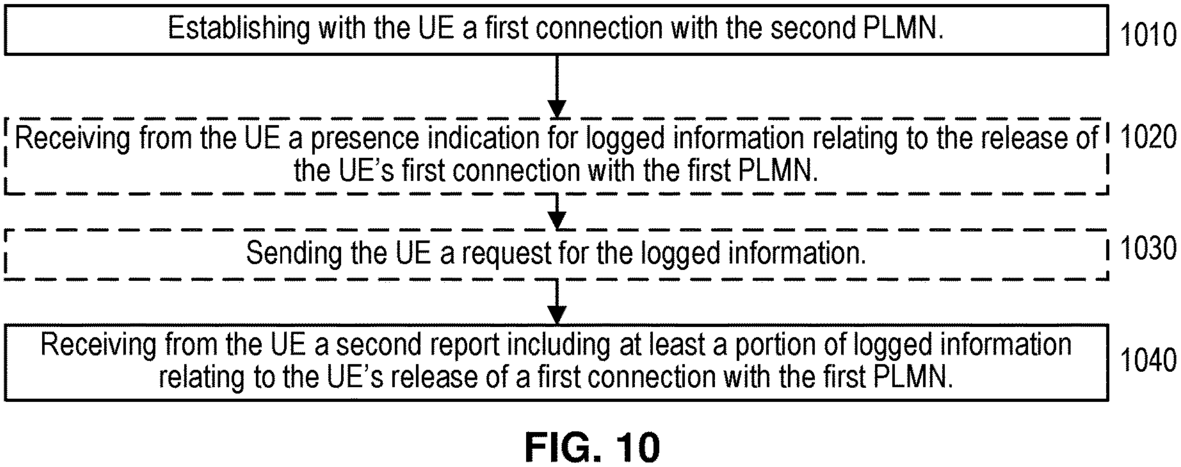
FIG. 10 is a flow diagram of an exemplary method (e.g., procedure) for a second network node (e.g., base station, eNB, gNB, ng-eNB, en-gNB, etc. or component(s) thereof), according to various embodiments of the present disclosure.

The embodiments described above can be further illustrated with reference to FIGS. 8-10, which show exemplary methods (e.g., procedures) for a UE, a first network node, and a second network node, respectively. In other words, various features of operations described below correspond to various embodiments described above. These exemplary methods can be used cooperatively to provide various exemplary benefits and/or advantages. Although FIGS. 8-10 show specific blocks in a particular order, the operations of the respective methods can be performed in different orders than shown and can be combined and/or divided into blocks having different functionality than shown. Optional blocks or operations are indicated by dashed lines.

In particular, FIG. 8 shows a flow diagram of an exemplary method (e.g., procedure) for a UE configured with user credentials for a plurality of PLMNs, according to various embodiments of the present disclosure. The exemplary method can be performed by a UE (e.g., wireless device), such as described elsewhere herein.

The exemplary method can include the operations of block 830, where while registered in first and second PLMNs and having a first connection with the first PLMN, the UE can release the first connection and log information relating to the release of the first connection. The exemplary method can also include operations of block 890, where after subsequently establishing a second connection with the first PLMN (e.g., in block 865), the UE can send the first PLMN a first report including the logged information relating to the release of the first connection with the first PLMN.

In some embodiments, the exemplary method can also include operations of blocks 810-820, where the UE can transmit to the first PLMN a request to release the first connection with the first PLMN and initiate a first timer upon transmitting the request to release the first connection with the first PLMN. Releasing the first connection and logging the information in block 830 can be performed upon expiration of the first timer without receiving a response from the first PLMN to the UE's request to release the first connection with the first PLMN.

In some of these embodiments, the exemplary method can also include the operations of blocks 835 and 870, where the UE can initiate a second timer upon expiration of the first timer and stop the second timer upon establishing the second connection with the first PLMN. The value of the second timer upon stopping is included in the logged information.

In some of these embodiments, one or more of the following applies:

- the UE is not configured to request release of the first connection by the first PLMN;
- the logged information includes an indication of whether the UE is configured to request release of the first connection by the first PLMN; and
- the logged information includes a cause of the release request.

In other embodiments, the UE is configured to request release of the first connection by the first PLMN and the exemplary method can also include the operations of block 825, where the UE can refrain from requesting release of the first connection by the first PLMN before releasing the first connection in block 830. In such embodiments, the logged information includes an indication that the UE did not request release of the first connection before the UE released the first connection.

In some embodiments, the exemplary method can also include operations of block 880, where the UE can receive a request for the logged information from the first PLMN after establishing the second connection with the first PLMN (e.g., in block 865). The first report is sent in block 890 in response to the request for the logged information. In some of these embodiments, the exemplary method can also include the operations of block 875, where the UE can send the first PLMN a presence indication for logged information relating to the release of the first connection with the first PLMN, e.g., after establishing the second connection with the first PLMN in block 865. The request can be received in block 880 in response to the presence indication.

In some embodiments, the exemplary method can also include the operations of blocks 840 and 855, where after releasing the first connection with the first PLMN, the UE can establish a first connection with the second PLMN and send the second PLMN a second report including at least a portion of the logged information relating to the release of the first connection with the first PLMN.

In some of these embodiments, the exemplary method can also include operations of block 850, where after establishing the first connection with the second PLMN, the UE can receive from the second PLMN a request for the logged information. The second report can be sent in block 855 in response to the request for the logged information. In some of these embodiments, the exemplary method can also include operations of block 845, where after establishing the first connection with the second PLMN (e.g., in block 840), the UE can send to the second PLMN a presence indication for logged information relating to the UE's release of the first connection with the first PLMN. The request can be received from the second PLMN in block 855 in response to the presence indication.

In some of these embodiments, one or more of the following applies:

- the second report (i.e., sent to the second PLMN) includes an indicator that the logged information is not associated with the second PLMN; and
- the first report (i.e., sent to the first PLMN) does not include an indicator that the logged information is associated with the first PLMN.

In some variants, the indicator that the logged information is not associated with the second PLMN is an identifier of the first PLMN.

In some of these embodiments, the logged information includes cell identifiers of the first PLMN, and the second report excludes the cell identifiers. In some of these embodiments, the exemplary method can also include the operations of block 860, where the UE can retain the logged information in UE memory after sending the second report. For example, this action can facilitate the UE sending the first report to the first PLMN in block 890.

In various embodiments, the logged information includes one or more of the following:

- serving cell measurements of one or more of the following in the first PLMN: the UE's PCell, the UE's PSCell, the UE's MCG SCells, and the UE's SCG SCells;
- measurements of neighbor cells operating at one or more of the following: a frequency of the UE's PCell, a frequency of the UE's PSCell, one or more frequencies of the UE's MCG SCells, and one or more frequencies of the UE's SCG SCells;
- UE location information;
- cell identifiers of the first PLMN; and
- information from one of more UE sensors.

In addition, FIG. 9 shows a flow diagram of an exemplary method (e.g., procedure) for a first network node configured to operate in a first PLMN and to manage a UE configured with user credentials for a plurality of PLMNs, according to various embodiments of the present disclosure. The exemplary method can be performed by a network node (e.g., base station, eNB, gNB, ng-eNB, en-gNB, etc., or components thereof) such as described elsewhere herein.

The exemplary method can include operations of block 910, where while the UE is registered in the first PLMN and in a second PLMN and has a first connection with the first PLMN, the first network node can receive from the UE a request to release the UE's first connection with the first PLMN. The exemplary method can also include operations of block 960, where after subsequently establishing with the UE a second connection with the first PLMN (e.g., in block 930), the first network node can receive from the UE a first report including logged information relating to the UE's release of the first connection with the first PLMN.

In some embodiments, the exemplary method can also include operations of block 920, where the first network node can refrain from sending a response to the release request, for at least a preconfigured duration (e.g., which can correspond to the UE first timer discussed above). In some of these embodiments, the logged information includes an indication of a duration between the following: when the UE released the first connection with the first PLMN, and establishing the UE's second connection with the first PLMN (e.g., in block 930).

In some of these embodiments, one or more of the following applies:

- the UE is not configured to request release of the first connection from the first PLMN;
- the logged information includes an indication of whether the UE is configured to request release of the first connection from the first PLMN; and
- the logged information includes a cause of the release request.

In other embodiments, the UE is configured to request release of the first connection by the first PLMN and the logged information includes an indication that the UE did not request release of the first connection before the UE released the first connection.

In some embodiments, the exemplary method can also include operations of block 950, where after establishing with the UE the second connection with the first PLMN (e.g., in block 930), the first network node can send the UE a request for the logged information. The first report can be received in block 960 in response to the request for the logged information. In some of these embodiments, the exemplary method can also include the operations of block 940, where after establishing with the UE the second connection with the first PLMN (e.g., in block 930), the first network node can receive from the UE a presence indication for logged information relating to the release of the first connection. The request can be sent in block 950 in response to the presence indication.

In various embodiments, the logged information (i.e., from the UE) can include any of the logged information mentioned above in relation to UE embodiments.

In addition, FIG. 10 shows a flow diagram of an exemplary method (e.g., procedure) for a second network node configured to operate in a second PLMN and to manage a UE configured with user credentials for a plurality of PLMNs, according to various embodiments of the present disclosure. The exemplary method can be performed by a network node (e.g., base station, eNB, gNB, ng-eNB, en-gNB, etc., or components thereof) such as described elsewhere herein.

The exemplary method can include operations of block 1010, where the second network node can establish with the UE a first connection with the second PLMN. The exemplary method can also include operations of block 1040, where the second network node can subsequently receive from the UE a second report including at least a portion of logged information relating to the UE's release of a first connection with the first PLMN.

In some embodiments, the first connection with the second PLMN is established (e.g., in block 1010) after the UE releases the first connection with the first PLMN, such as discussed above for UE and first network node embodiments.

In some embodiments, the exemplary method can also include operations of block 1030, where the second network node can send the UE a request for the logged information after establishing with the UE the first connection with the second PLMN (e.g., in block 1010). The second report can be received in block 1040 in response to the request for the logged information. In some of these embodiments, the exemplary method can also include operations of block 1020, where after establishing with the UE the first connection with the second PLMN (e.g., in block 1010), the second network node can receive from the UE a presence indication for logged information relating to the UE's release of the first connection with the first PLMN. The request can be sent in block 1030 in response to the presence indication.

In some of these embodiments, the second report includes an indicator that the logged information is not associated with the second PLMN. In some of these embodiments, the indicator that the logged information is not associated with the second PLMN is an identifier of the first PLMN.

In various embodiments, the logged information (i.e., from the UE) can include any of the logged information mentioned above in relation to UE embodiments. At least a portion of this logged information can be received in the second report, e.g., in block 1040. In some variants, when the logged information includes cell identifiers of the first PLMN, the second report excludes the cell identifiers.

FIGS. 11-16 show various communication systems, network nodes, and UEs in which various embodiments of the present disclosure can be implemented.

Figure 11:
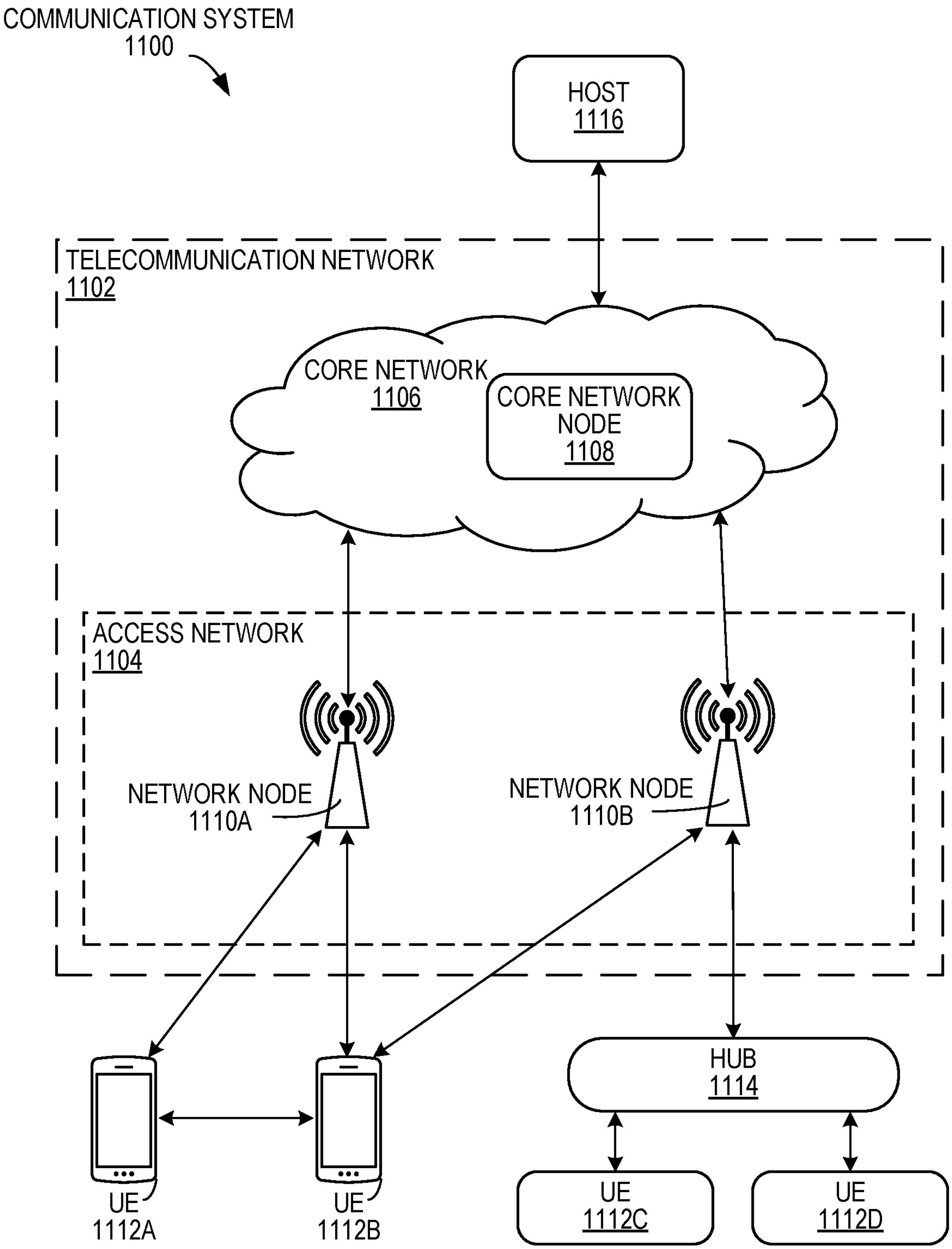
FIG. 11 shows a communication system according to various embodiments of the present disclosure.

FIG. 11 shows an example of a communication system 1100 in accordance with some embodiments. In this example, the communication system 1100 includes a telecommunication network 1102 that includes an access network 1104, such as a radio access network (RAN), and a core network 1106, which includes one or more core network nodes 1108. The access network 1104 includes one or more access network nodes, such as network nodes 1110*a* and 1110*b* (one or more of which may be generally referred to as network nodes 1110), or any other similar 3GPP access node or non-3GPP access point. The network nodes 1110 facilitate direct or indirect connection of UEs, such as by connecting UEs 1112*a*, 1112*b*, 1112*c*, and 1112*d* (one or more of which may be generally referred to as UEs 1112) to the core network 1106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1100 may include any number of wired or wireless networks, network nodes, UEs, and/or any other components or systems that may facilitate or participate in the communication of data and/or signals whether via wired or wireless connections. The communication system 1100 may include and/or interface with any type of communication, telecommunication, data, cellular, radio network, and/or other similar type of system.

The UEs 1112 may be any of a wide variety of communication devices, including wireless devices arranged, configured, and/or operable to communicate wirelessly with the network nodes 1110 and other communication devices. Similarly, the network nodes 1110 are arranged, capable, configured, and/or operable to communicate directly or indirectly with the UEs 1112 and/or with other network nodes or equipment in the telecommunication network 1102 to enable and/or provide network access, such as wireless network access, and/or to perform other functions, such as administration in the telecommunication network 1102.

In the depicted example, the core network 1106 connects the network nodes 1110 to one or more hosts, such as host 1116. These connections may be direct or indirect via one or more intermediary networks or devices. In other examples, network nodes may be directly coupled to hosts. The core network 1106 includes one more core network nodes (e.g., core network node 1108) that are structured with hardware and software components. Features of these components may be substantially similar to those described with respect to the UEs, network nodes, and/or hosts, such that the descriptions thereof are generally applicable to the corresponding components of the core network node 1108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1116 may be under the ownership or control of a service provider other than an operator or provider of the access network 1104 and/or the telecommunication network 1102, and may be operated by the service provider or on behalf of the service provider. The host 1116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1100 of FIG. 11 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1102 is a cellular network that implements 3GPP standardized features. Accordingly, the telecommunications network 1102 may support network slicing to provide different logical networks to different devices that are connected to the telecommunication network 1102. For example, the telecommunications network 1102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1112 are configured to transmit and/or receive information without direct human interaction. For instance, a UE may be designed to transmit information to the access network 1104 on a predetermined schedule, when triggered by an internal or external event, or in response to requests from the access network 1104. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1114 communicates with the access network 1104 to facilitate indirect communication between one or more UEs (e.g., UE 1112*c* and/or 1112*d*) and network nodes (e.g., network node 1110*b*). In some examples, the hub 1114 may be a controller, router, content source and analytics, or any of the other communication devices described herein regarding UEs. For example, the hub 1114 may be a broadband router enabling access to the core network 1106 for the UEs. As another example, the hub 1114 may be a controller that sends commands or instructions to one or more actuators in the UEs. Commands or instructions may be received from the UEs, network nodes 1110, or by executable code, script, process, or other instructions in the hub 1114. As another example, the hub 1114 may be a data collector that acts as temporary storage for UE data and, in some embodiments, may perform analysis or other processing of the data. As another example, the hub 1114 may be a content source. For example, for a UE that is a VR headset, display, loudspeaker or other media delivery device, the hub 1114 may retrieve VR assets, video, audio, or other media or data related to sensory information via a network node, which the hub 1114 then provides to the UE either directly, after performing local processing, and/or after adding additional local content. In still another example, the hub 1114 acts as a proxy server or orchestrator for the UEs, in particular in if one or more of the UEs are low energy IoT devices.

The hub 1114 may have a constant/persistent or intermittent connection to the network node 1110*b*. The hub 1114 may also allow for a different communication scheme and/or schedule between the hub 1114 and UEs (e.g., UE 1112*c* and/or 1112*d*), and between the hub 1114 and the core network 1106. In other examples, the hub 1114 is connected to the core network 1106 and/or one or more UEs via a wired connection. Moreover, the hub 1114 may be configured to connect to an M2M service provider over the access network 1104 and/or to another UE over a direct connection. In some scenarios, UEs may establish a wireless connection with the network nodes 1110 while still connected via the hub 1114 via a wired or wireless connection. In some embodiments, the hub 1114 may be a dedicated hub—that is, a hub whose primary function is to route communications to/from the UEs from/to the network node 1110*b*. In other embodiments, the hub 1114 may be a non-dedicated hub—that is, a device which is capable of operating to route communications between the UEs and network node 1110*b*, but which is additionally capable of operating as a communication start and/or end point for certain data channels.

Figure 12:
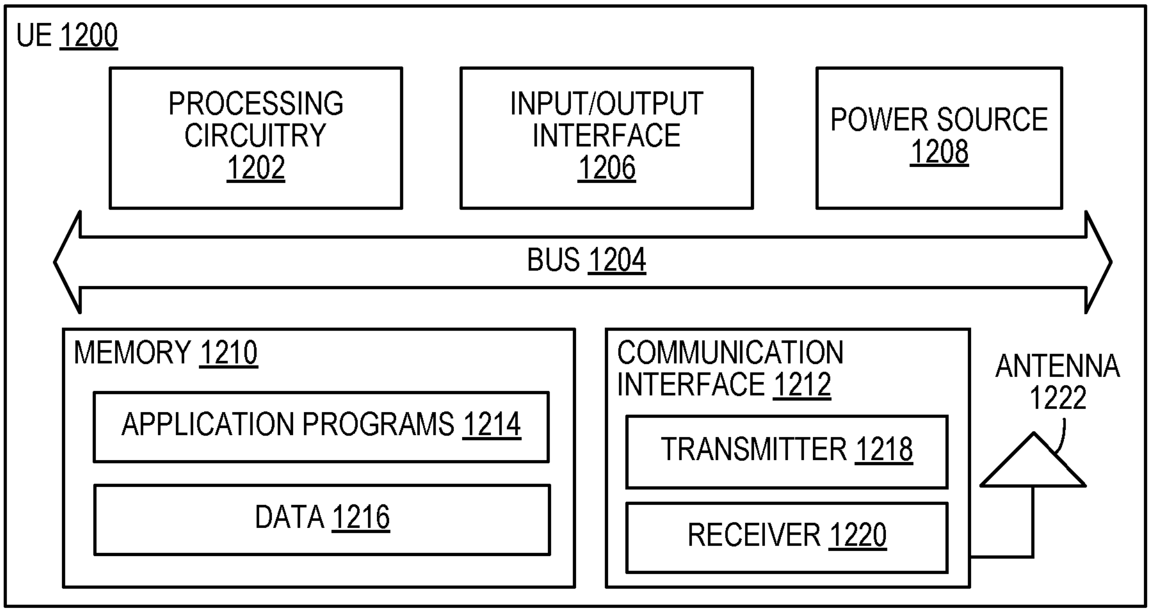
FIG. 12 shows a UE according to various embodiments of the present disclosure.

FIG. 12 shows a UE 1200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1200 includes processing circuitry 1202 that is operatively coupled via a bus 1204 to an input/output interface 1206, a power source 1208, a memory 1210, a communication interface 1212, and/or any other component, or any combination thereof. Certain UEs may utilize all or a subset of the components shown in FIG. 12. The level of integration between the components may vary from one UE to another UE. Further, certain UEs may contain multiple instances of a component, such as multiple processors, memories, transceivers, transmitters, receivers, etc.

The processing circuitry 1202 is configured to process instructions and data and may be configured to implement any sequential state machine operative to execute instructions stored as machine-readable computer programs in the memory 1210. The processing circuitry 1202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1202 may include multiple central processing units (CPUs).

In the example, the input/output interface 1206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1208 is structured as a battery or battery pack. Other types of power sources, such as an external power source (e.g., an electricity outlet), photovoltaic device, or power cell, may be used. The power source 1208 may further include power circuitry for delivering power from the power source 1208 itself, and/or an external power source, to the various parts of the UE 1200 via input circuitry or an interface such as an electrical power cable. Delivering power may be, for example, for charging of the power source 1208. Power circuitry may perform any formatting, converting, or other modification to the power from the power source 1208 to make the power suitable for the respective components of the UE 1200 to which power is supplied.

The memory 1210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1210 includes one or more application programs 1214, such as an operating system, web browser application, a widget, gadget engine, or other application, and corresponding data 1216. The memory 1210 may store, for use by the UE 1200, any of a variety of various operating systems or combinations of operating systems.

The memory 1210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1210 may allow the UE 1200 to access instructions, application programs and the like, stored on transitory or non-transitory memory media, to off-load data, or to upload data. An article of manufacture, such as one utilizing a communication system may be tangibly embodied as or in the memory 1210, which may be or comprise a device-readable storage medium.

The processing circuitry 1202 may be configured to communicate with an access network or other network using the communication interface 1212. The communication interface 1212 may comprise one or more communication subsystems and may include or be communicatively coupled to an antenna 1222. The communication interface 1212 may include one or more transceivers used to communicate, such as by communicating with one or more remote transceivers of another device capable of wireless communication (e.g., another UE or a network node in an access network). Each transceiver may include a transmitter 1218 and/or a receiver 1220 appropriate to provide network communications (e.g., optical, electrical, frequency allocations, and so forth). Moreover, the transmitter 1218 and receiver 1220 may be coupled to one or more antennas (e.g., antenna 1222) and may share circuit components, software or firmware, or alternatively be implemented separately.

In the illustrated embodiment, communication functions of the communication interface 1212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1200 shown in FIG. 12.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 13:
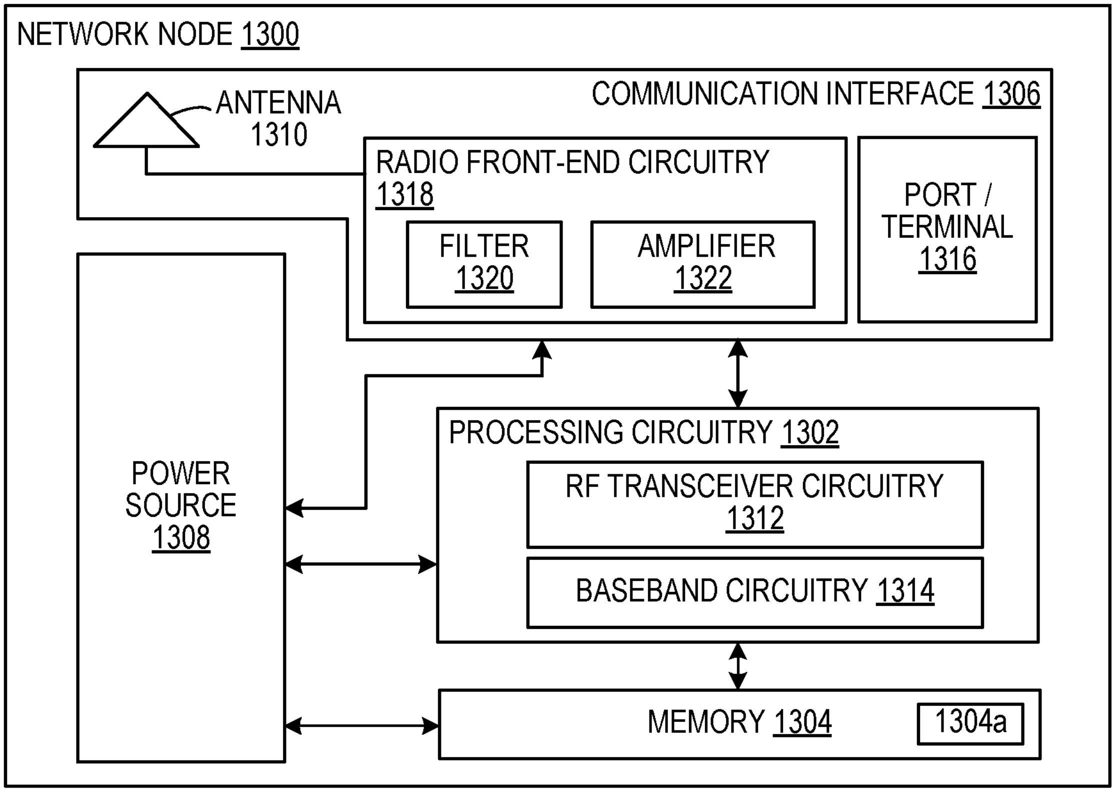
FIG. 13 shows a network node according to various embodiments of the present disclosure.

FIG. 13 shows a network node 1300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1300 includes a processing circuitry 1302, a memory 1304, a communication interface 1306, and a power source 1308. The network node 1300 may be composed of multiple physically separate components (e.g., a NodeB component and a RNC component, or a BTS component and a BSC component, etc.), which may each have their own respective components. In certain scenarios in which the network node 1300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1300 may be configured to support multiple radio access technologies (RATs). In such embodiments, some components may be duplicated (e.g., separate memory 1304 for different RATs) and some components may be reused (e.g., a same antenna 1310 may be shared by different RATs). The network node 1300 may also include multiple sets of the various illustrated components for different wireless technologies integrated into network node 1300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1300.

The processing circuitry 1302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1300 components, such as the memory 1304, to provide network node 1300 functionality.

In some embodiments, the processing circuitry 1302 includes a system on a chip (SOC). In some embodiments, the processing circuitry 1302 includes one or more of radio frequency (RF) transceiver circuitry 1312 and baseband processing circuitry 1314. In some embodiments, the radio frequency (RF) transceiver circuitry 1312 and the baseband processing circuitry 1314 may be on separate chips (or sets of chips), boards, or units, such as radio units and digital units. In alternative embodiments, part or all of RF transceiver circuitry 1312 and baseband processing circuitry 1314 may be on the same chip or set of chips, boards, or units.

The memory 1304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1302. The memory 1304 may store any suitable instructions, data, or information, including a computer program, software, an application including one or more of logic, rules, code, tables, and/or other instructions (collectively denoted computer program product **1304*a*) capable of being executed by the processing circuitry 1302 and utilized by the network node 1300. The memory 1304 may be used to store any calculations made by the processing circuitry 1302 and/or any data received via the communication interface 1306. In some embodiments, the processing circuitry 1302 and memory 1304** is integrated.

The communication interface 1306 is used in wired or wireless communication of signaling and/or data between a network node, access network, and/or UE. As illustrated, the communication interface 1306 comprises port(s)/terminal(s) 1316 to send and receive data, for example to and from a network over a wired connection. The communication interface 1306 also includes radio front-end circuitry 1318 that may be coupled to, or in certain embodiments a part of, the antenna 1310. Radio front-end circuitry 1318 comprises filters 1320 and amplifiers 1322. The radio front-end circuitry 1318 may be connected to an antenna 1310 and processing circuitry 1302. The radio front-end circuitry may be configured to condition signals communicated between antenna 1310 and processing circuitry 1302. The radio front-end circuitry 1318 may receive digital data that is to be sent out to other network nodes or UEs via a wireless connection. The radio front-end circuitry 1318 may convert the digital data into a radio signal having the appropriate channel and bandwidth parameters using a combination of filters 1320 and/or amplifiers 1322. The radio signal may then be transmitted via the antenna 1310. Similarly, when receiving data, the antenna 1310 may collect radio signals which are then converted into digital data by the radio front-end circuitry 1318. The digital data may be passed to the processing circuitry 1302. In other embodiments, the communication interface may comprise different components and/or different combinations of components.

In certain alternative embodiments, the network node 1300 does not include separate radio front-end circuitry 1318, instead, the processing circuitry 1302 includes radio front-end circuitry and is connected to the antenna 1310. Similarly, in some embodiments, all or some of the RF transceiver circuitry 1312 is part of the communication interface 1306. In still other embodiments, the communication interface 1306 includes one or more ports or terminals 1316, the radio front-end circuitry 1318, and the RF transceiver circuitry 1312, as part of a radio unit (not shown), and the communication interface 1306 communicates with the baseband processing circuitry 1314, which is part of a digital unit (not shown).

The antenna 1310 may include one or more antennas, or antenna arrays, configured to send and/or receive wireless signals. The antenna 1310 may be coupled to the radio front-end circuitry 1318 and may be any type of antenna capable of transmitting and receiving data and/or signals wirelessly. In certain embodiments, the antenna 1310 is separate from the network node 1300 and connectable to the network node 1300 through an interface or port.

The antenna 1310, communication interface 1306, and/or the processing circuitry 1302 may be configured to perform any receiving operations and/or certain obtaining operations described herein as being performed by the network node. Any information, data and/or signals may be received from a UE, another network node and/or any other network equipment. Similarly, the antenna 1310, the communication interface 1306, and/or the processing circuitry 1302 may be configured to perform any transmitting operations described herein as being performed by the network node. Any information, data and/or signals may be transmitted to a UE, another network node and/or any other network equipment.

The power source 1308 provides power to the various components of network node 1300 in a form suitable for the respective components (e.g., at a voltage and current level needed for each respective component). The power source 1308 may further comprise, or be coupled to, power management circuitry to supply the components of the network node 1300 with power for performing the functionality described herein. For example, the network node 1300 may be connectable to an external power source (e.g., the power grid, an electricity outlet) via an input circuitry or interface such as an electrical cable, whereby the external power source supplies power to power circuitry of the power source 1308. As a further example, the power source 1308 may comprise a source of power in the form of a battery or battery pack which is connected to, or integrated in, power circuitry. The battery may provide backup power should the external power source fail.

Embodiments of the network node 1300 may include additional components beyond those shown in FIG. 13 for providing certain aspects of the network node's functionality, including any of the functionality described herein and/or any functionality necessary to support the subject matter described herein. For example, the network node 1300 may include user interface equipment to allow input of information into the network node 1300 and to allow output of information from the network node 1300. This may allow a user to perform diagnostic, maintenance, repair, and other administrative functions for the network node 1300.

Figure 14:
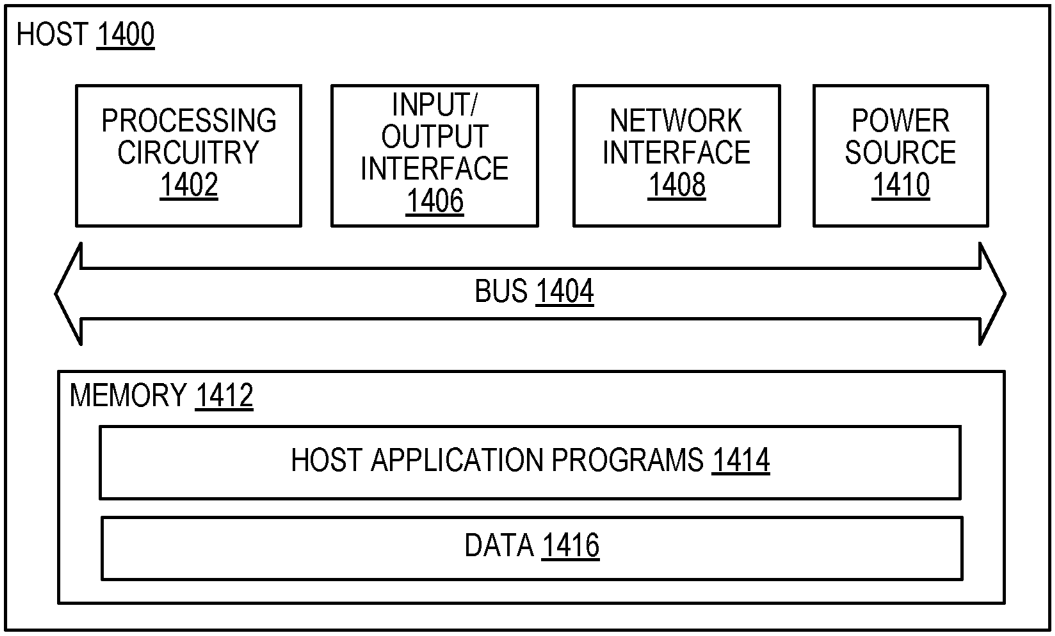
FIG. 14 shows host computing system according to various embodiments of the present disclosure.

FIG. 14 is a block diagram of a host 1400, which may be an embodiment of the host 1116 of FIG. 11, in accordance with various aspects described herein. As used herein, the host 1400 may be or comprise various combinations hardware and/or software, including a standalone server, a blade server, a cloud-implemented server, a distributed server, a virtual machine, container, or processing resources in a server farm. The host 1400 may provide one or more services to one or more UEs.

The host 1400 includes processing circuitry 1402 that is operatively coupled via a bus 1404 to an input/output interface 1406, a network interface 1408, a power source 1410, and a memory 1412. Other components may be included in other embodiments. Features of these components may be substantially similar to those described with respect to the devices of previous figures, such as FIGS. 12 and 13, such that the descriptions thereof are generally applicable to the corresponding components of host 1400.

The memory 1412 may include one or more computer programs including one or more host application programs 1414 and data 1416, which may include user data, e.g., data generated by a UE for the host 1400 or data generated by the host 1400 for a UE. Embodiments of the host 1400 may utilize only a subset or all of the components shown. The host application programs 1414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1414 may also provide for user authentication and licensing checks and may periodically report health, routes, and content availability to a central node, such as a device in or on the edge of a core network. Accordingly, the host 1400 may select and/or indicate a different host for over-the-top services for a UE. The host application programs 1414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 15:
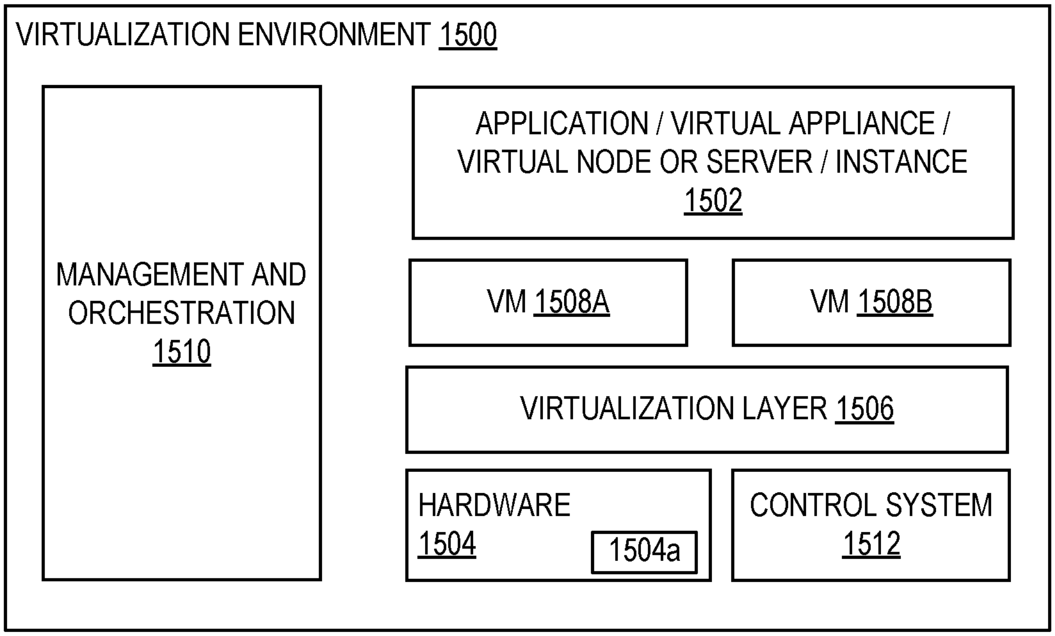
FIG. 15 is a block diagram of a virtualization environment in which functions implemented by some embodiments of the present disclosure may be virtualized.

FIG. 15 is a block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1504 includes processing circuitry, memory that stores software and/or instructions (collectively denoted computer program product 1504*a*) executable by hardware processing circuitry, and/or other hardware devices as described herein, such as a network interface, input/output interface, and so forth. Software may be executed by the processing circuitry to instantiate one or more virtualization layers 1506 (also referred to as hypervisors or virtual machine monitors (VMMs)), provide VMs 1508*a* and 1508*b* (one or more of which may be generally referred to as VMs 1508), and/or perform any of the functions, features and/or benefits described in relation with some embodiments described herein. The virtualization layer 1506 may present a virtual operating platform that appears like networking hardware to the VMs 1508.

The VMs 1508 comprise virtual processing, virtual memory, virtual networking or interface and virtual storage, and may be run by a corresponding virtualization layer 1506. Different embodiments of the instance of a virtual appliance 1502 may be implemented on one or more of VMs 1508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1508 may be a software implementation of a physical machine that runs programs as if they were executing on a physical, non-virtualized machine. Each of the VMs 1508, and that part of hardware 1504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1508 on top of the hardware 1504 and corresponds to the application 1502.

Hardware 1504 may be implemented in a standalone network node with generic or specific components. Hardware 1504 may implement some functions via virtualization. Alternatively, hardware 1504 may be part of a larger cluster of hardware (e.g., such as in a data center or CPE) where many hardware nodes work together and are managed via management and orchestration 1510, which, among others, oversees lifecycle management of applications 1502. In some embodiments, hardware 1504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1512 which may alternatively be used for communication between hardware nodes and radio units.

Figure 16:
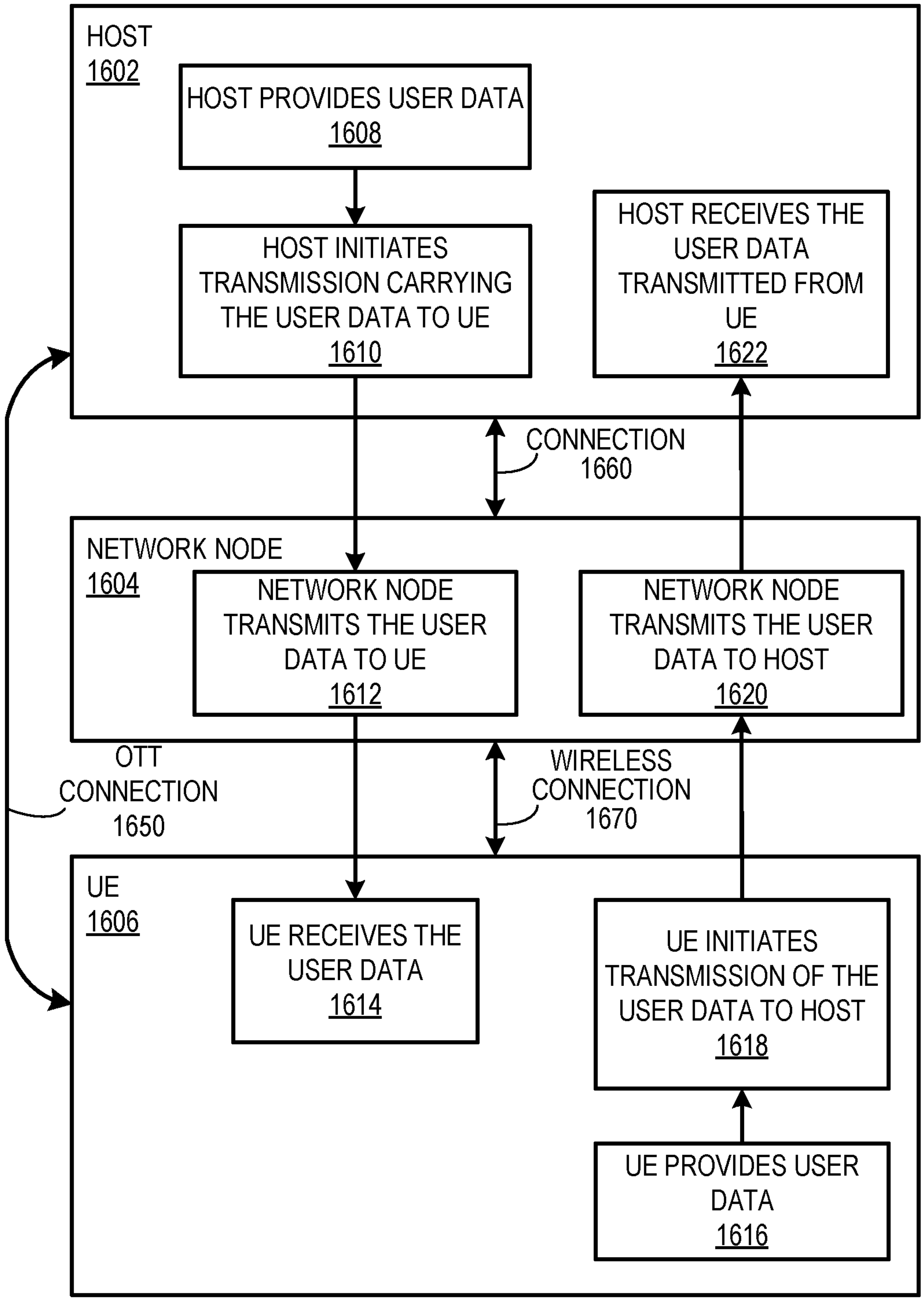
FIG. 16 illustrates communication between a host computing system, a network node, and a UE via multiple connections, at least one of which is wireless, according to various embodiments of the present disclosure.

FIG. 16 shows a communication diagram of a host 1602 communicating via a network node 1604 with a UE 1606 over a partially wireless connection in accordance with some embodiments. Example implementations, in accordance with various embodiments, of the UE (such as a UE 1112*a* of FIG. 11 and/or UE 1200 of FIG. 12), network node (such as network node 1110*a* of FIG. 11 and/or network node 1300 of FIG. 13), and host (such as host 1116 of FIG. 11 and/or host 1400 of FIG. 14) discussed in the preceding paragraphs will now be described with reference to FIG. 16.

Like host 1400, embodiments of host 1602 include hardware, such as a communication interface, processing circuitry, and memory. The host 1602 also includes software, which is stored in or accessible by the host 1602 and executable by the processing circuitry. The software includes a host application that may be operable to provide a service to a remote user, such as the UE 1606 connecting via an over-the-top (OTT) connection 1650 extending between the UE 1606 and host 1602. In providing the service to the remote user, a host application may provide user data which is transmitted using the OTT connection 1650.

The network node 1604 includes hardware enabling it to communicate with the host 1602 and UE 1606. The connection 1660 may be direct or pass through a core network (like core network 1106 of FIG. 11) and/or one or more other intermediate networks, such as one or more public, private, or hosted networks. For example, an intermediate network may be a backbone network or the Internet.

The UE 1606 includes hardware and software, which is stored in or accessible by UE 1606 and executable by the UE's processing circuitry. The software includes a client application, such as a web browser or operator-specific "app" that may be operable to provide a service to a human or non-human user via UE 1606 with the support of the host 1602. In the host 1602, an executing host application may communicate with the executing client application via the OTT connection 1650 terminating at the UE 1606 and host 1602. In providing the service to the user, the UE's client application may receive request data from the host's host application and provide user data in response to the request data. The OTT connection 1650 may transfer both the request data and the user data. The UE's client application may interact with the user to generate the user data that it provides to the host application through the OTT connection 1650.

The OTT connection 1650 may extend via a connection 1660 between the host 1602 and the network node 1604 and via a wireless connection 1670 between the network node 1604 and the UE 1606 to provide the connection between the host 1602 and the UE 1606. The connection 1660 and wireless connection 1670, over which the OTT connection 1650 may be provided, have been drawn abstractly to illustrate the communication between the host 1602 and the UE 1606 via the network node 1604, without explicit reference to any intermediary devices and the precise routing of messages via these devices.

As an example of transmitting data via the OTT connection 1650, in step 1608, the host 1602 provides user data, which may be performed by executing a host application. In some embodiments, the user data is associated with a particular human user interacting with the UE 1606. In other embodiments, the user data is associated with a UE 1606 that shares data with the host 1602 without explicit human interaction. In step 1610, the host 1602 initiates a transmission carrying the user data towards the UE 1606. The host 1602 may initiate the transmission responsive to a request transmitted by the UE 1606. The request may be caused by human interaction with the UE 1606 or by operation of the client application executing on the UE 1606. The transmission may pass via the network node 1604, in accordance with the teachings of the embodiments described throughout this disclosure. Accordingly, in step 1612, the network node 1604 transmits to the UE 1606 the user data that was carried in the transmission that the host 1602 initiated, in accordance with the teachings of the embodiments described throughout this disclosure. In step 1614, the UE 1606 receives the user data carried in the transmission, which may be performed by a client application executed on the UE 1606 associated with the host application executed by the host 1602.

In some examples, the UE 1606 executes a client application which provides user data to the host 1602. The user data may be provided in reaction or response to the data received from the host 1602. Accordingly, in step 1616, the UE 1606 may provide user data, which may be performed by executing the client application. In providing the user data, the client application may further consider user input received from the user via an input/output interface of the UE 1606. Regardless of the specific manner in which the user data was provided, the UE 1606 initiates, in step 1618, transmission of the user data towards the host 1602 via the network node 1604. In step 1620, in accordance with the teachings of the embodiments described throughout this disclosure, the network node 1604 receives user data from the UE 1606 and initiates transmission of the received user data towards the host 1602. In step 1622, the host 1602 receives the user data carried in the transmission initiated by the UE 1606.

One or more of the various embodiments improve the performance of OTT services provided to the UE 1306 using the OTT connection 1350, in which the wireless connection 1370 forms the last segment. More precisely, embodiments described herein can provide various benefits and/or advantages for operation of MUSIM UEs, including providing indication to a first PLMN that a connection between the UE and the first PLMN was released due to a UE autonomous release from the first PLMN (e.g., to switch to the second PLMN). In this manner, the first PLMN operator can be informed about whether a lost connection with the UE is due to a problem with the link between the UE and the network, or due to a UE-autonomous release of the connection. The first PLMN operator can consider this cause information when deciding if/when to take actions to tune that network. This avoids degradations to network performance caused by network tuning and/or adjustments based on misunderstandings or lack of information. At a high level, embodiments facilitate more consistent operation of UEs and networks, which increases the value of OTT services provided to UEs over such networks to both end users and OTT service providers.

In an example scenario, factory status information may be collected and analyzed by the host 1602. As another example, the host 1602 may process audio and video data which may have been retrieved from a UE for use in creating maps. As another example, the host 1602 may collect and analyze real-time data to assist in controlling vehicle congestion (e.g., controlling traffic lights). As another example, the host 1602 may store surveillance video uploaded by a UE. As another example, the host 1602 may store or control access to media content such as video, audio, VR or AR which it can broadcast, multicast or unicast to UEs. As other examples, the host 1602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1650 between the host 1602 and UE 1606, in response to variations in the measurement results. The measurement procedure and/or the network functionality for reconfiguring the OTT connection may be implemented in software and hardware of the host 1602 and/or UE 1606. In some embodiments, sensors (not shown) may be deployed in or in association with other devices through which the OTT connection 1650 passes; the sensors may participate in the measurement procedure by supplying values of the monitored quantities exemplified above or by supplying values of other physical quantities from which software may compute or estimate the monitored quantities. The reconfiguring of the OTT connection 1650 may include message format, retransmission settings, preferred routing etc.; the reconfiguring need not directly alter the operation of the network node 1604. Such procedures and functionalities may be known and practiced in the art. In certain embodiments, measurements may involve proprietary UE signaling that facilitates measurements of throughput, propagation times, latency and the like, by the host 1602. The measurements may be implemented in that software causes messages to be transmitted, in particular empty or 'dummy' messages, using the OTT connection 1650 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously.

The techniques and apparatus described herein include, but are not limited to, the following enumerated examples:

A1. A method for a user equipment (UE) configured with user credentials for a plurality of public land mobile networks (PLMNs), the method comprising:
- while registered in first and second PLMNs and having a first connection to the first PLMN, releasing the first connection and logging information relating to the release of the first connection; and
- after subsequently establishing a second connection to the first PLMN, sending the first PLMN a first report including the logged information relating to the release of the first connection to the first PLMN.

A2. The method of embodiment A1, further comprising
- transmitting to the first PLMN a request to release the first connection; and
- initiating a first timer upon transmitting the release request,
- wherein releasing the connection and logging the information is performed upon expiration of the first timer without receiving a response to the release request from the first PLMN.

A3. The method of embodiment A2, further comprising:
- initiating a second timer upon expiration of the first timer; and
- stopping the second timer upon establishing the second connection with the first PLMN,
- wherein the value of the second timer upon stopping is included in the logged information.

A4. The method of any of embodiments A2-A3, wherein one or more of the following applies:
- the UE is not configured to request release of the first connection from the first PLMN;
- the logged information includes an indication of whether the UE is configured to request release of the first connection from the first PLMN; and
- the logged information includes a cause of the release request.

A5. The method of embodiment A1, wherein:
- the UE is configured to request release of the first connection from the first PLMN;
- the method further comprises refraining from transmitting a request to release the first connection before releasing the first connection; and
- the logged information includes an indication that the UE did not transmit a release request before releasing the first connection.

A6. The method of any of embodiments A1-A5, further comprising receiving a request for the logged information from the first PLMN after establishing the second connection to the first PLMN, wherein the first report is sent in response to the request for the logged information.

A7. The method of embodiment A6, further comprising, after establishing the second connection to the first PLMN, sending the first PLMN a presence indication for logged information relating to the release of the first connection, wherein the request is received in response to the presence indication.

A8. The method of any of embodiments A1-A7, further comprising:
- establishing a first connection to the second PLMN after releasing the first connection to the first PLMN; and
- sending the second PLMN a second report including at least a portion of the logged information relating to the release of the first connection to the first PLMN.

A8a. The method of embodiment A8, further comprising receiving from the second PLMN a request for the logged information after establishing the first connection to the second PLMN, wherein the second report is sent in response to the request for the logged information.

A8b. The method of embodiment A8a, further comprising, after establishing the first connection to the second PLMN, sending to the second PLMN a presence indication for logged information relating to the UE's release of the first connection to the first PLMN, wherein the request is received in response to the presence indication.

A9. The method of any of embodiments A8-A8b, wherein one or more of the following applies:
- the second report includes an indicator that the logged information is not associated with the second PLMN; and
- the first report does not include an indicator that the logged information is associated with the first PLMN.

A10. The method of embodiment A9, wherein the indicator that the logged information is not associated with the second PLMN is an identifier of the first PLMN.

A11. The method of any of embodiments A8-A10, wherein the logged information includes cell identifiers of the first PLMN, and the second report excludes the cell identifiers.

A12. The method of any of embodiments A8-A11, further comprising retaining the logged information in UE memory after sending the second report.

A13. The method of any of embodiments A1-A12, wherein the logged information includes one or more of the following:

- serving cell measurements of one or more of the following in the first PLMN: the UE's primary cell (PCell), the UE's primary secondary cell group cell (PSCell), the UE's master cell group (MCG) secondary cells (SCells), and the UE's secondary cell group (SCG) SCells
- measurements of neighbor cells at one or more of the following in the first PLMN: a frequency of the PCell, a frequency of the PSCell, frequencies of the MCG SCells, and frequencies of the SCG SCells;
- UE location information; and
- Information from one of more UE sensors.

B1. A method for a first network node, of a first public land mobile networks (PLMN), to manage a user equipment (UE) configured with user credentials for a plurality of PLMNs, the method comprising:

- while the UE is registered in the first PLMN and in a second PLMN and has a first connection to the first PLMN, receiving from the UE a request to release the first connection; and
- after subsequently establishing with the UE a second connection to the first PLMN, receiving from the UE a first report including logged information relating to the UE's release of the first connection to the first PLMN.

B2. The method of embodiment B1, further comprising refraining from sending a response to the release request for at least a preconfigured duration.

B3. The method of embodiment B2, the logged information includes a duration between when the UE released the first connection and when the second connection was established.

B4. The method of any of embodiments B2-B3, wherein one or more of the following applies:

- the UE is not configured to request release of the first connection from the first PLMN;
- the logged information includes an indication of whether the UE is configured to request release of the first connection from the first PLMN; and
- the logged information includes a cause of the release request.

B5. The method of embodiment B1, wherein:

- the UE is configured to request release of the first connection from the first PLMN; and
- the logged information includes an indication that the UE did not transmit a release request before releasing the first connection.

B6. The method of any of embodiments B1-B5, further comprising, after establishing with the UE the second connection to the first PLMN, sending to the UE a request for the logged information, wherein the first report is received in response to the request for the logged information.

B7. The method of embodiment B6, further comprising, after establishing with the UE the second connection to the first PLMN, receiving from the UE a presence indication for logged information relating to the release of the first connection, wherein the request is sent in response to the present indication.

B8. The method of any of embodiments B1-B7, further comprising determining that the logged information is associated with the first PLMN based on one of the following in the first report: an identifier of the first PLMN, or absence of an indication that the logged information is associated with the first PLMN.

B9. The method of any of embodiments B1-B8, wherein the logged information includes one or more of the following:

- serving cell measurements of one or more of the following in the first PLMN: the UE's primary cell (PCell), the UE's primary secondary cell group cell (PSCell), the UE's master cell group (MCG) secondary cells (SCells), and the UE's secondary cell group (SCG) SCells;
- measurements of neighbor cells at one or more of the following in the first PLMN: a frequency of the PCell, a frequency of the PSCell, frequencies of the MCG SCells, and frequencies of the SCG SCells;
- UE location information;
- cell identifiers of the first PLMN; and
- information from one of more UE sensors.

C1. A method for a second network node, of a second public land mobile networks (PLMN), to manage a user equipment (UE) configured with user credentials for a plurality of PLMNs, the method comprising:

- establishing with the UE a first connection to the second PLMN; and
- subsequently receiving from the UE a second report including at least a portion of logged information relating to the UE's release of a first connection to the first PLMN.

C2. The method of embodiment C1, wherein the first connection to the second PLMN is established after the UE releases the first connection to the first PLMN.

C3. The method of any of embodiments C1-C2, further comprising sending the UE a request for the logged information after establishing with the UE the first connection to the second PLMN, wherein the second report is received in response to the request for the logged information.

C4. The method of embodiment C3, further comprising, after establishing with the UE the first connection to the second PLMN, receiving from the UE a presence indication for logged information relating to the UE's release of the first connection to the first PLMN, wherein the request is sent in response to the present indication.

C5. The method of any of embodiments C1-C4, wherein the second report includes an indicator that the logged information is not associated with the second PLMN.

C6. The method of embodiment C5, wherein the indicator that the logged information is not associated with the second PLMN is an identifier of the first PLMN.

C7. The method of any of embodiments C1-C6, wherein the logged information includes one or more of the following:

- serving cell measurements of one or more of the following in the first PLMN: the UE's primary cell (PCell), the UE's primary secondary cell group cell (PSCell), the UE's master cell group (MCG) secondary cells (SCells), and the UE's secondary cell group (SCG) SCells measurements of neighbor cells at one or more of the following in the first PLMN: a frequency of the PCell, a frequency of the PSCell, frequencies of the MCG SCells, and frequencies of the SCG SCells;

UE location information;

cell identifiers of the first PLMN; and information from one of more UE sensors.

C8. The method of embodiment C7, wherein when the logged information includes cell identifiers of the first PLMN, the second report excludes the cell identifiers.

D1. A user equipment (UE) configured with user credentials for a plurality of public land mobile networks (PLMNs), the UE comprising:

communication interface circuitry configured to communicate with network nodes in first and second PLMNs; and processing circuitry operatively coupled to the communication interface circuitry, whereby the processing circuitry and the communication interface circuitry are configured to perform operations corresponding to the methods of any of embodiments A1-A13.

D2. A user equipment (UE) configured with user credentials for a plurality of public land mobile networks (PLMNs), the UE being further configured to perform operations corresponding to the methods of any of embodiments A1-A13.

D3. A non-transitory, computer-readable medium storing computer-executable instructions that, when executed by processing circuitry of a configured with user credentials for a plurality of public land mobile networks (PLMNs), configure the UE to perform operations corresponding to the methods of any of embodiments A1-A13.

D4. A computer program product comprising computer-executable instructions that, when executed by processing circuitry of a configured with user credentials for a plurality of public land mobile networks (PLMNs), configure the UE to perform operations corresponding to the methods of any of embodiments A1-A13.

E1. A first network node, of a first public land mobile networks (PLMN), arranged to manage a user equipment (UE) configured with user credentials for a plurality of PLMNs, the first network node comprising:

communication interface circuitry configured to communicate with at least the UE; and processing circuitry operatively coupled to the communication interface circuitry, whereby the processing circuitry and the communication interface circuitry are configured to perform operations corresponding to any of the methods of embodiments B1-B9.

E2. A first network node, of a first public land mobile networks (PLMN), arranged to manage a user equipment (UE) configured with user credentials for a plurality of PLMNs, the first network node being further arranged to perform operations corresponding to any of the methods of embodiments B1-B9.

E3. A non-transitory, computer-readable medium storing computer-executable instructions that, when executed by processing circuitry of a first network node, of a first PLMN, arranged to manage a user equipment (UE) configured with user credentials for a plurality of PLMNs, configure the first network node to perform operations corresponding to any of the methods of embodiments B1-B9.

E4. A computer program product comprising computer-executable instructions that, when executed by processing circuitry of a first network node, of a first PLMN, arranged to manage a user equipment (UE) configured with user credentials for a plurality of PLMNs, configure the first network node to perform operations corresponding to any of the methods of embodiments B1-B9.

F1. A second network node, of a second public land mobile networks (PLMN), arranged to manage a user equipment (UE) configured with user credentials for a plurality of PLMNs, the second network node comprising:

communication interface circuitry configured to communicate with at least the UE; and processing circuitry operatively coupled to the communication interface circuitry, whereby the processing circuitry and the communication interface circuitry are configured to perform operations corresponding to the methods of any of embodiments C1-C8.

F2. A second network node, of a second public land mobile networks (PLMN), arranged to manage a user equipment (UE) configured with user credentials for a plurality of PLMNs, the second network node being further arranged to perform operations corresponding to the methods of any of embodiments C1-C8.

F3. A non-transitory, computer-readable medium storing computer-executable instructions that, when executed by processing circuitry of a second network node, of a second PLMN, arranged to manage a user equipment (UE) configured with user credentials for a plurality of PLMNs, configure the second network node to perform operations corresponding to the methods of any of embodiments C1-C8.

F4. A computer program product comprising computer-executable instructions that, when executed by processing circuitry of a second network node, of a second PLMN, arranged to manage a user equipment (UE) configured with user credentials for a plurality of PLMNs, configure the second network node to perform operations corresponding to the methods of any of embodiments C1-C8.

The invention claimed is:

1. A method for a user equipment (UE) configured with user credentials for a plurality of public land mobile networks (PLMNs), the method comprising:

while registered in first and second PLMNs and having a first connection with the first PLMN, releasing the first connection and logging information relating to the release of the first connection; and after subsequently establishing a second connection with the first PLMN, sending to the first PLMN a first report including the logged information relating to the release of the first connection with the first PLMN, wherein the logged information indicates that the UE's release of the first connection with the first PLMN is not due to a failure of the first connection with the first PLMN.

2. The method of claim 1, further comprising:

transmitting to the first PLMN a request to release the first connection with the first PLMN; and initiating a first timer upon transmitting the request to release the first connection with the first PLMN, wherein releasing the first connection and logging the information is performed upon expiration of the first timer without receiving from the first PLMN a response to the request to release the first connection with the first PLMN.

3. The method of claim 2, further comprising:

initiating a second timer upon expiration of the first timer; and stopping the second timer upon establishing the second connection with the first PLMN, wherein the value of the second timer upon stopping is included in the logged information.

4. The method of claim 2, wherein one or more of the following applies:

the UE is not configured to request release of the first connection by the first PLMN;

the logged information includes an indication of whether the UE is configured to request release of the first connection by the first PLMN; and the logged information includes a cause of the release request.

5. The method of claim 1, wherein:

the UE is configured to request release of the first connection by the first PLMN;

the method further comprises refraining from requesting release of the first connection by the first PLMN before releasing the first connection; and the logged information includes an indication that the UE did not request release of the first connection before the UE released the first connection.

6. The method of claim 1, further comprising receiving a request for the logged information from the first PLMN after establishing the second connection with the first PLMN, wherein the first report is sent in response to the request for the logged information.

7. The method of claim 6, further comprising, after establishing the second connection with the first PLMN, sending to the first PLMN a presence indication for logged information relating to the release of the first connection with the first PLMN, wherein the request is received from the first PLMN in response to the presence indication.

8. The method of claim 1, further comprising, after releasing the first connection with the first PLMN:

establishing a first connection with the second PLMN; and sending to the second PLMN a second report including at least a portion of the logged information relating to the release of the first connection with the first PLMN, wherein the at least a portion of the logged information indicates that the UE's release of the first connection with the first PLMN is not due to a failure of the first connection with the first PLMN.

9. The method of claim 8, further comprising receiving from the second PLMN a request for the logged information after establishing the first connection with the second PLMN, wherein the second report is sent in response to the request for the logged information.

10. The method of claim 9, further comprising, after establishing the first connection with the second PLMN, sending to the second PLMN a presence indication for logged information relating to the UE's release of the first connection with the first PLMN, wherein the request is received from the second PLMN in response to the presence indication.

11. A method for a first network node configured to operate in a first public land mobile network (PLMN) and to manage a user equipment (UE) configured with user credentials for a plurality of PLMNs, the method comprising:

while the UE is registered in the first PLMN and in a second PLMN and has a first connection with the first PLMN, receiving from the UE a request to release the first connection with the first PLMN; and after subsequently establishing with the UE a second connection with the first PLMN, receiving from the UE a first report including logged information relating to the UE's release of the first connection with the first PLMN, wherein the logged information indicates that the UE's release of the first connection with the first PLMN is not due to a failure of the first connection with the first PLMN.

12. The method of claim 11, further comprising refraining from sending, for at least a preconfigured duration, a response to the request to release the UE's first connection with the first PLMN.

13. The method of claim 12, the logged information includes an indication of a duration between the following: when the UE released the first connection with the first PLMN, and establishing the UE's second connection with the first PLMN.

14. A method for a second network node configured to operate in a second public land mobile network (PLMN) and to manage a user equipment (UE) configured with user credentials for a plurality of PLMNs, the method comprising:

establishing with the UE a first connection with the second PLMN; and subsequently receiving from the UE a second report including at least a portion of logged information relating to the UE's release of a first connection with a first PLMN, wherein the at least a portion of the logged information indicates that the UE's release of the first connection with the first PLMN is not due to a failure of the first connection with the first PLMN.

15. A second network node configured to operate in a second public land mobile network (PLMN) and to manage a user equipment (UE) configured with user credentials for a plurality of PLMNs, the second network node comprising communication interface circuitry and processing circuitry that are operatively coupled and are configured to perform the method of claim 14.

16. A user equipment (UE) configured with user credentials for a plurality of public land mobile networks (PLMNs), the UE comprising communication interface circuitry and processing circuitry that are operatively coupled to the communication interface circuitry, whereby the processing circuitry and the communication interface circuitry and are configured to:

while registered in the first and second PLMNs and having a first connection with the first PLMN, release the first connection and log information relating to the release of the first connection; and after subsequently establishing a second connection with the first PLMN, send to the first PLMN a first report including the logged information relating to the release of the first connection with the first PLMN, wherein the logged information indicates that the UE's release of the first connection with the first PLMN is not due to a failure of the first connection with the first PLMN.

17. The UE of claim 16, wherein the processing circuitry and the communication interface circuitry are further configured to:

transmit to the first PLMN a request to release the first connection with the first PLMN; and initiate a first timer upon transmitting the request to release the first connection with the first PLMN, wherein the processing circuitry and the communication interface circuitry are configured to release the first connection and log the information upon expiration of the first timer without receiving from the first PLMN a response to the request to release the first connection with the first PLMN.

18. The UE of claim 16, wherein the processing circuitry and the communication interface circuitry are further configured to, after releasing the first connection with the first PLMN:

establish a first connection with the second PLMN; and send to the second PLMN a second report including at least a portion of the logged information relating to the release of the first connection with the first PLMN.

19. A first network node configured to operate in a first public land mobile network (PLMN) and to manage a user equipment (UE) configured with user credentials for a plurality of PLMNs, the first network comprising communication interface circuitry and processing circuitry that are operatively coupled and are configured to:

while the UE is registered in the first PLMN and in a second PLMN and has a first connection with the first PLMN, receive from the UE a request to release the UE's first connection with the first PLMN; and after subsequently establishing with the UE a second connection with the first PLMN, receive from the UE a first report including logged information relating to the UE's release of the first connection with the first PLMN, wherein the logged information indicates that the UE's release of the first connection with the first PLMN is not due to a failure of the first connection with the first PLMN.

20. The first network node of claim 19, wherein the processing circuitry and the communication interface circuitry are further configured to refrain from sending, for at least a preconfigured duration, a response to the request to release the UE's first connection with the first PLMN.

* * * * *